(12) United States Patent
Asano et al.

(10) Patent No.: US 9,873,174 B2
(45) Date of Patent: Jan. 23, 2018

(54) TURNING CONTROLLER

(71) Applicant: Yamazaki Mazak Corporation, Niwa-gun (JP)

(72) Inventors: Kohei Asano, Niwa-gun (JP); Yasuharu Sumida, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 279 days.

(21) Appl. No.: 14/963,243

(22) Filed: Dec. 9, 2015

(65) Prior Publication Data

US 2016/0089760 A1 Mar. 31, 2016

Related U.S. Application Data

(63) Continuation of application No. PCT/JP2014/068863, filed on Jul. 16, 2014.

(51) Int. Cl.
*B23Q 15/14* (2006.01)
*B23B 1/00* (2006.01)
(Continued)

(52) U.S. Cl.
CPC ............. *B23Q 15/14* (2013.01); *B23B 1/00* (2013.01); *B23Q 15/26* (2013.01); *G05B 19/404* (2013.01);
(Continued)

(58) Field of Classification Search
None
See application file for complete search history.

(56) References Cited

U.S. PATENT DOCUMENTS 6,457,391 B1 10/2002 Yamazaki et al.
2001/0048857 A1* 12/2001 Koch .............. G05B 19/4061
409/132

(Continued)

FOREIGN PATENT DOCUMENTS

CN 1324707 12/2001
CN 103522348 1/2014
(Continued)

OTHER PUBLICATIONS

International Search Report for corresponding International Application No. PCT/JP2014/066863, dated Oct. 21, 2014.
(Continued)

*Primary Examiner* — Jason Lin
(74) *Attorney, Agent, or Firm* — Mori & Ward, LLP

(57) ABSTRACT

A turning controller includes a storage, a working program processing device, a command value setting processing device, an approach angle setting command amount calculator, and a command processing device. The storage is configured to store a working program and tool shape data. The working program processing device is configured to analyze the working program and to calculate and output command amounts. The command value setting processing device is configured to set an approach angle command value for defining an approach angle. The approach angle setting command amount calculator is configured to calculate, as an approach angle setting command amount, a B-axis command amount for controlling to cause the approach angle to have the approach angle command value based on the tool shape data. The command processing device is configured to output the approach angle setting command amount to the B-axis driver.

6 Claims, 18 Drawing Sheets

(51) Int. Cl.
  *G05B 19/404* (2006.01)
  *B23Q 15/26* (2006.01)
  *G05B 19/4093* (2006.01)

(52) U.S. Cl.
  CPC .......... *G05B 19/40937* (2013.01); *G05B 2219/36204* (2013.01); *G05B 2219/37344* (2013.01); *G05B 2219/50282* (2013.01); *Y02P 90/265* (2015.11)

(56) References Cited

U.S. PATENT DOCUMENTS

| | | | |
|---|---|---|---|
| 2002/0117021 | A1 | 8/2002 | Nakahira et al. |
| 2007/0179661 | A1* | 8/2007 | Onozuka .......... G05B 19/40937 700/173 |
| 2008/0091295 | A1 | 4/2008 | Corey |
| 2009/0182451 | A1 | 7/2009 | Jennessen et al. |
| 2013/0218320 | A1 | 8/2013 | Michishita et al. |
| 2015/0293519 | A1* | 10/2015 | Maeda .......... B23C 3/00 700/186 |

FOREIGN PATENT DOCUMENTS

| | | |
|---|---|---|
| JP | 07-214416 | 8/1995 |
| JP | 2001-328002 | 11/2001 |
| JP | 2002-154034 | 5/2002 |
| JP | 2002-187003 | 7/2002 |
| JP | 2003-39201 | 2/2003 |
| JP | 2009-113143 | 5/2009 |
| JP | 2009-538744 | 11/2009 |
| JP | 2014-087878 | 5/2014 |
| WO | WO 2012/057207 | 5/2012 |

OTHER PUBLICATIONS

Written Opinion for corresponding International Application No. PCT/JP2014/068663, dated Oct. 21, 2014.
The decision to grant a patent for corresponding JP Application No. 2015-505752, Jun. 9, 2015.
Chinese Office Action for corresponding CN Application No. 201480040279.4, dated Jul. 5, 2016.
Extended European Search Report for corresponding EP Application No. 14894814.4-1807, dated Oct. 12, 2016.

* cited by examiner

| TOOL No. | CUTTING EDGE ANGLE ($\beta$) | REFERENCE CUTTING ANGLE ($\gamma$) | NOSE RADIUS (R) |
|---|---|---|---|
| 1 | | | |
| 2 | | | |
| | | | |

TURNING CONTROLLER

CROSS-REFERENCE TO RELATED APPLICATIONS

The present application is a continuation application of International Application No. PCT/JP2014/068863, filed Jul. 16, 2014. The contents of this application are incorporated herein by reference in their entirety.

BACKGROUND OF THE INVENTION

Field of the Invention

The present invention relates to a turning controller.

Discussion of the Background

It is well known that a workpiece is held on a spindle of a lathe and is thus rotated, and a tool is fed in a longitudinal direction of the workpiece (a Z-axis direction) to carry out turning work with a cutting edge of the tool cut in a predetermined cutting depth in a radial direction (an X-axis direction) of the workpiece. When the turning work is performed, a principal force, a feed force, and a thrust force are applied to the tool. The thrust force is a component in a radial direction (an X-axis direction) of a cutting resistance of the workpiece, and applies a force so as to bend the workpiece in the radial direction (the X-axis direction) of the workpiece. For this reason, when a fine shaft having a high aspect ratio is subjected to turning work, it is impossible to ignore influence on turning accuracy by the thrust force.

Therefore, it is conventionally proposed that a tool capable of setting the thrust force to zero should be designed as disclosed in Japanese Unexamined Patent Application Publication No. 2009-113143, for example. Specifically, Japanese Unexamined Patent Application Publication No. 2009-113143 describes designing a tool including an approach angle for causing a thrust force to be zero when a certain cutting depth is set based on knowledge that a single approach angle for causing the thrust force to be zero is defined depending on the cutting depth.

SUMMARY OF THE INVENTION

According to one aspect of the present invention, a turning controller, using a turning device, is to rotate a workpiece held on a spindle and relatively feed a tool in at least the Z-axis direction in a cutting state in a predetermined cutting depth in the X-axis direction with respect to the workpiece, thereby performing turning work. The turning device includes the spindle, a tool holding unit, a Z-axis driver, an X-axis driver, and a B-axis driver. The spindle is to be rotated together with the workpiece held thereon. The tool holding unit is to hold the tool to turn the workpiece. The Z-axis driver is to displace at least one of the spindle and the tool holding unit in a Z-axis direction which is a direction parallel to a rotation axis of the spindle. The X-axis driver is to displace at least one of the spindle and the tool holding unit in an X-axis direction orthogonal to the Z axis. The B-axis driver is to incline the tool holding unit around a Y axis orthogonal to both of the Z axis and the X axis. The turning controller includes a storage, a working program processing device, a command value setting processing device, an approach angle setting command amount calculator, and a command processing device. The storage is configured to store a working program for defining the turning work and tool shape data indicative of a shape of the tool. The working program processing device is configured to analyze the working program and to calculate and output command amounts for the Z-axis driver, the X-axis driver, and the B-axis driver. The command value setting processing device is configured to set an approach angle command value for defining an approach angle which is an angle formed by a cutting edge of the tool and a direction orthogonal to a relative feeding direction of the tool with respect to the workpiece when performing the turning work. The approach angle setting command amount calculator is configured to calculate, as an approach angle setting command amount, a B-axis command amount for controlling to cause the approach angle to have the approach angle command value based on the tool shape data. The command processing device is configured to output the approach angle setting command amount to the B-axis driver. The working program includes cutting depth data for defining a cutting depth and approach angle data for defining the approach angle. The turning controller further comprises an approach angle calculator configured to calculate an approach angle at which an absolute value of a thrust force to be applied to the workpiece by the tool is equal to or smaller than a specified value when performing the turning work according to the cutting depth data of the working program. The approach angle calculator is configured to register the calculated approach angle as the approach angle data into the working program. The command value setting processing device is configured to set the approach angle data to the approach angle command value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
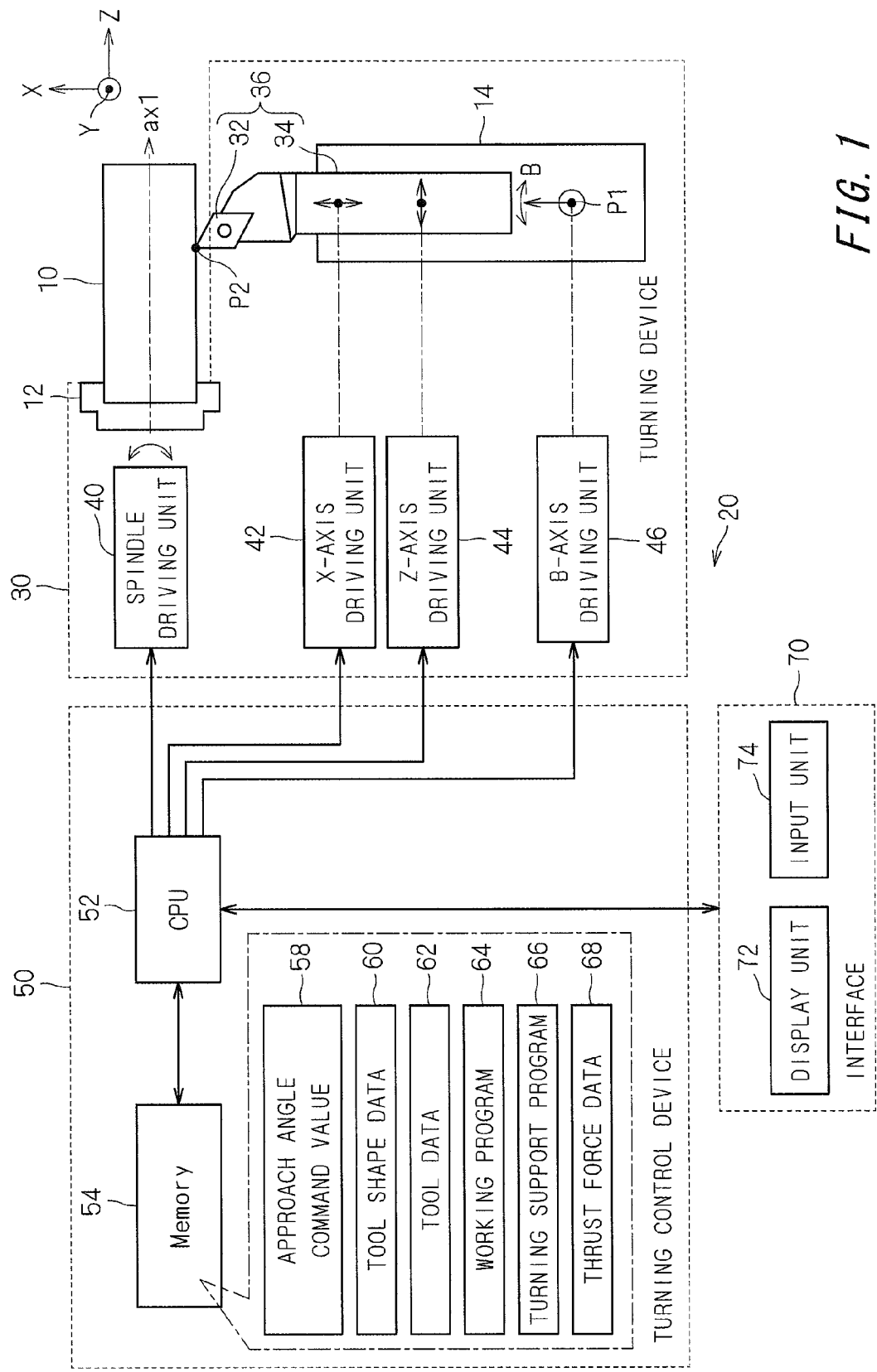
FIG. 1 is a view showing a system configuration according to an embodiment.

The embodiments will now be described with reference to the accompanying drawings, wherein like reference numerals designate corresponding or identical elements throughout the various drawings.

An embodiment of a turning control device, a turning method, and a turning support program will be described below with reference to the drawings.

A turning system 20 shown in FIG. 1 is a composite working lathe system for turning a workpiece 10. The turning system 20 includes a turning device 30, a turning control device 50, and an interface 70.

In the present embodiment, a cylindrical workpiece is assumed as the workpiece 10.

The turning device 30 includes a spindle 12 for holding the workpiece 10, a cutting tool 36 which is a tool, and a tool holding unit 14 for holding the cutting tool 36. The spindle 12 is rotatable around a rotation axis ax1. The cutting tool 36 includes an insert 32 serving as a cutting edge for turning the workpiece 10 and a shank 34 for supporting the insert 32.

Figure 2:
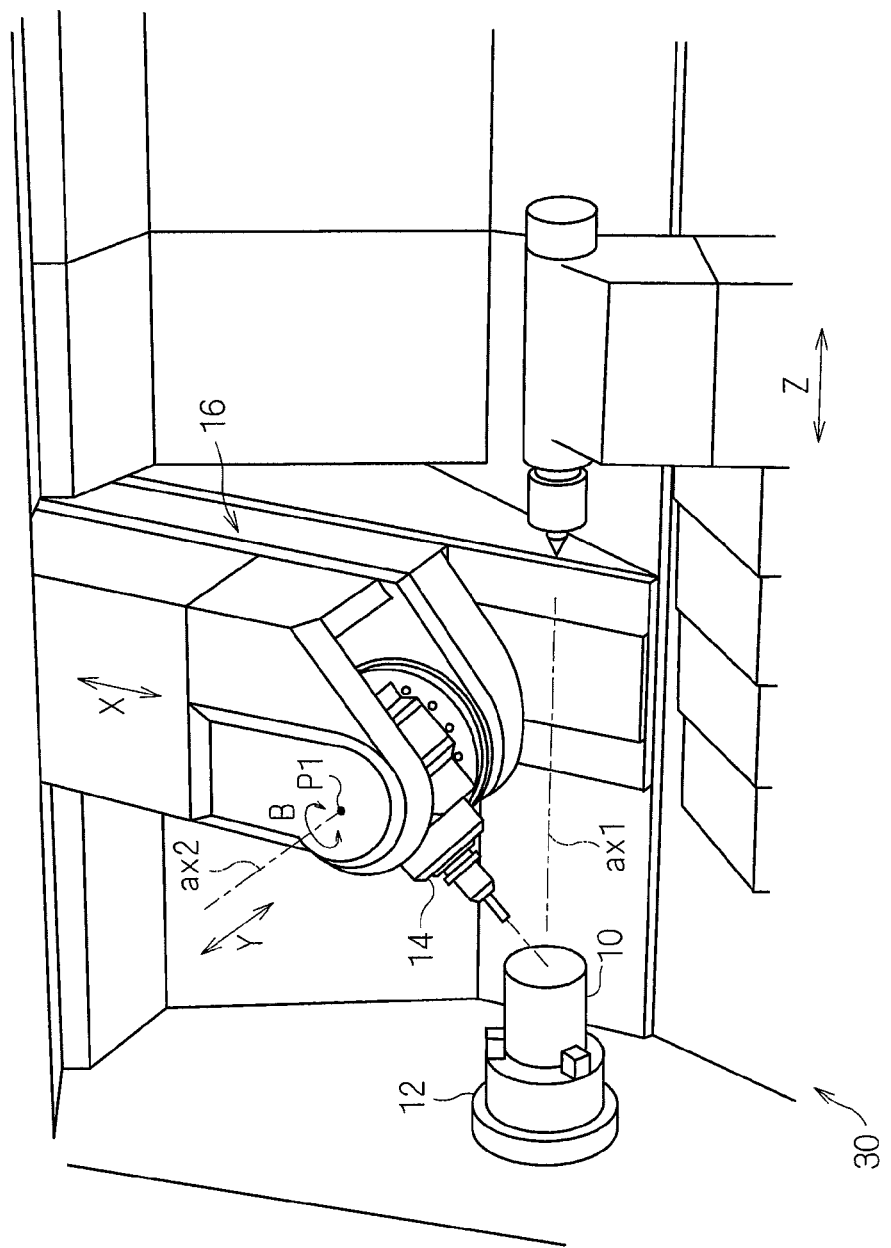
FIG. 2 is a perspective view showing a partial structure of a turning device according to the embodiment.

FIG. 2 shows a partial structure of the turning device 30 holding the workpiece 10.

As shown, the turning device 30 further has a tool holding device 16 including the tool holding unit 14 such that the tool holding unit 14 is inclinable. The tool holding device 16 is linearly displaceable in a Z-axis direction which is parallel to the rotation axis ax1 and an X-axis direction which is orthogonal to a Z axis. On the other hand, the tool holding unit 14 is provided to be inclinable around an axis ax2 which is parallel to a Y axis orthogonal to both of the Z axis and the X axis and passes through a B-axis center P1 on the tool holding device 16. The spindle 12, the tool holding unit 14, and the tool holding device 16 are driven by respective driving units shown in FIG. 1.

In other words, the turning device 30 shown in FIG. 1 includes a spindle driving unit 40 for rotating the spindle 12 around the rotation axis ax1. Moreover, the turning device 30 includes an X-axis driving unit 42 for displacing the tool holding device 16 in the X-axis direction and a Z-axis driving unit 44 for displacing the tool holding device 16 in the Z-axis direction. The tool holding device 16 is displaced in the X-axis direction so that the cutting tool 36 is also displaced in the X-axis direction, and the tool holding device 16 is displaced in the Z-axis direction so that the cutting tool 36 is also displaced in the Z-axis direction. Furthermore, the turning device 30 includes a B-axis driving unit 46 for inclining the tool holding unit 14 around the axis ax2. The B-axis driving unit 46 serves to drive the B axis of the tool holding unit 14, and the B axis is described as "B" in FIGS. 1 and 2.

The turning control device 50 serves as a control device for controlling the turning device 30 to carry out turning work. Specifically, the turning control device 50 calculates respective command amounts of the spindle driving unit 40, the X-axis driving unit 42, the Z-axis driving unit 44, and the B-axis driving unit 46 in the turning device 30, and outputs the calculated command amounts to the spindle driving unit 40, the X-axis driving unit 42, the Z-axis driving unit 44, and the B-axis driving unit 46, respectively. Herein, the command amount of the spindle driving unit 40 indicates a rotation speed of the spindle 12. Moreover, the command amount of the X-axis driving unit 42 indicates an X-axis direction displacement amount of the tool holding device 16. Furthermore, the command amount of the Z-axis driving unit 44 indicates a Z-axis direction displacement amount of the tool holding device 16. In addition, the command amount of the B-axis driving unit 46 indicates an inclination angle of the tool holding unit 14 with the axis ax2 as a center.

The turning control device 50 includes a central processing unit (CPU) 52 for performing various arithmetic processing and a memory 54. Tool shape data 60, tool data 62, a working program 64, a turning support program 66, and thrust force data 68 are stored in the memory 54. Moreover, the memory 54 has, as an internal variable, an approach angle command value 58 for defining an approach angle in the turning work.

Figure 3A:
FIG. 3A is a view showing tool shape data according to the embodiment.
Figure 3B:
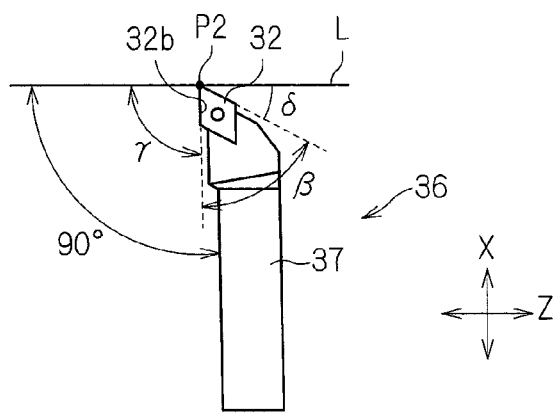
FIG. 3B is a view showing a definition of the tool shape data.

As shown in FIG. 3A, the tool shape data 60 is data including information about a cutting edge angle $\beta$, a reference cutting angle $\gamma$, and a nose radius R for each identification information (tool No) for designating each tool. FIG. 3B shows the cutting edge angle $\beta$ and the reference cutting angle $\gamma$. The cutting edge angle $\beta$ indicates an angle of a cutting edge P2 of the insert 32. The reference cutting angle $\gamma$ is a parameter for specifying a shape of a cutting edge (a main cutting edge portion 32b) on a travelling direction side of the insert 32. In the present embodiment, the reference cutting angle $\gamma$ indicates an angle formed by the main cutting edge portion 32b of the insert 32 and an axial center of the workpiece in the case where the shank 34 of the cutting tool 36 is opposed to the axial center of the workpiece in an orthogonal posture (in FIG. 3B, a straight line L represents a straight line parallel to the axial center of the workpiece). This posture of the cutting tool 36 is obtained when the tool holding unit 14 is positioned on a B-axis origin. Herein, it is assumed that the B-axis origin indicates a B-axis position in the case where the cutting tool 36 attached to the tool holding unit 14 is parallel to the X-axis direction and is opposed to the workpiece, and the cutting tool 36 is attached in the same direction as the direction of the tool holding unit 14.

Figure 3C:
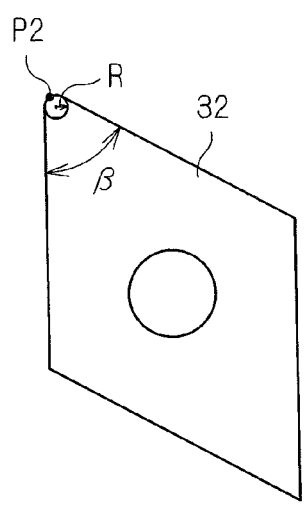
FIG. 3C is a view showing a definition of a nose radius.

FIG. 3C shows the nose radius R. The nose radius R indicates a radius of curvature for defining the shape of the cutting edge P2 of the insert 32. In FIG. 3B, a clearance angle $\delta$ is also shown. The clearance angle $\delta$ represents an angle formed by a flank (a back face in a travelling direction) of the insert 32 and a finished surface of the workpiece. Note that, it is assumed that the cutting tool 36 originally uses the tool holding unit 14 at the B-axis origin.

Figure 4:
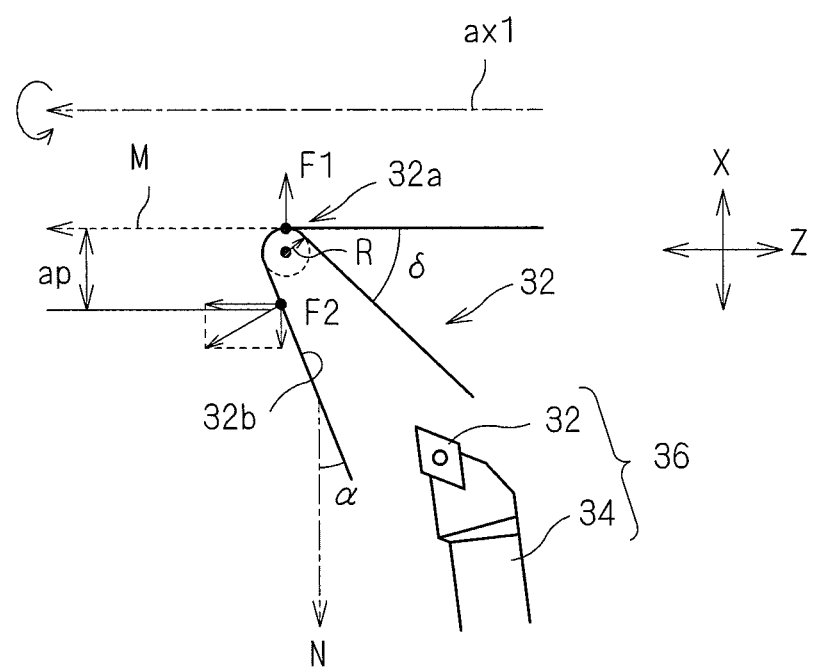
FIG. 4 is a view showing an approach angle.

FIG. 4 shows an approach angle $\alpha$ and a cutting depth ap. FIG. 4 shows the cutting tool 36, and a part of the insert 32 in the cutting tool 36 which is enlarged. As shown, the approach angle $\alpha$ is an angle formed by a direction N (for example, the X-axis direction) which is orthogonal to a feeding direction M (for example, the Z-axis direction) of the cutting tool 36 and the main cutting edge portion 32b. A positive direction of the approach angle α is set to be a side where rotation is performed in a counterclockwise direction from the direction N in the present embodiment. FIG. 4 also shows the cutting depth ap of the workpiece 10. In the present embodiment, the cutting depth ap is set to be a value greater than the nose radius R. If the approach angle α is positive as shown in FIG. 4, a thrust force F1 to be applied to the workpiece 10 by a tip portion 32a of the insert 32 is opposite to a thrust force F2 to be applied to the workpiece 10 by the main cutting edge portion 32b. The thrust force F2 can be adjusted based on the approach angle α and the thrust force F2 can also be equal to the thrust force F1.

Figure 5A:
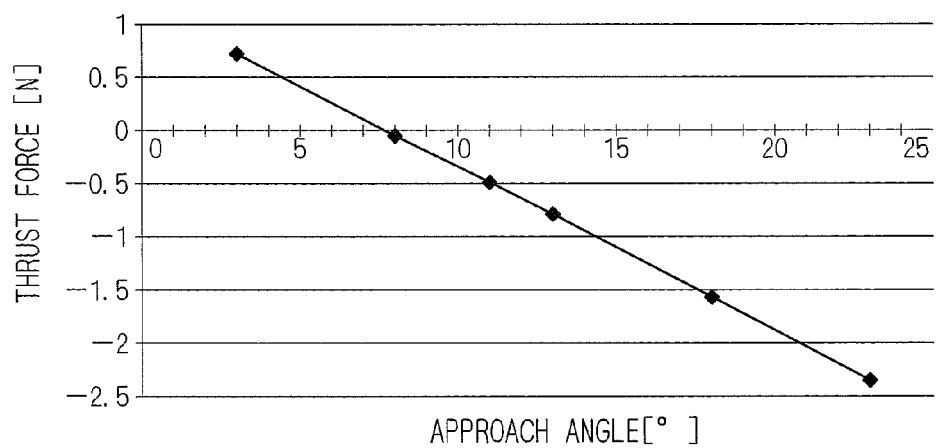
FIGS. 5A and 5B are views showing thrust force data according to the embodiment.
Figure 5B:
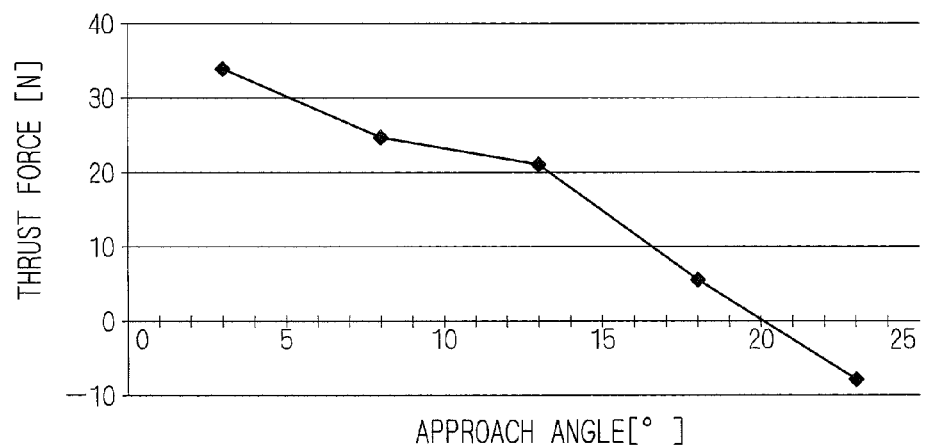

FIGS. 5A and 5B illustrate data on a relationship between the approach angle and the thrust force in the turning work in a predetermined cutting depth by means of a specific tool which is obtained experimentally. In FIG. 5A, the cutting depth is 1.5 mm, a cutting speed is 120 m/min, and a feeding speed is 0.01 mm/rev, with dry cutting. In FIG. 5A, a cutting angle is 93°, a rake angle is 0°, and a nose radius is 0.2 mm, without chip breaker. In FIG. 5A, an insert grade is cemented carbide and a workpiece material is C3604. In FIG. 5B, the cutting depth is 1.0 mm, the cutting speed is 100 m/min, and the feeding speed is 0.1 mm/rev, with wet cutting. In FIG. 5B, the cutting angle is 93°, the rake angle is 0°, and the nose radius is 0.2 mm, with chip breaker. In FIG. 5B, the insert grade is cermet and the workpiece material is S45C. As is apparent from these two examples, when the tool and the cutting depth are given, it is possible to set the thrust force in the turning work to zero by properly deciding the approach angle. In other words, it is possible to change the approach angle in the turning work by inclining the tool holding unit 14 holding the tool around the B axis, and it is also possible to cause the thrust force to be zero by setting the B-axis angle of the tool holding unit 14 to a proper angle, thereby performing the turning work.

The working program 64 is a data group for defining how to perform the turning work for the workpiece 10. In the present embodiment, the working program 64 is a data group required for turning work which includes data indicative of working shapes and data indicative of working conditions such as the approach angle α and the cutting depth ap described above.

The present embodiment is intended for turning work to be performed by causing the tool to carry out cutting in a predetermined cutting depth in the X-axis direction, that is, a radial direction of the workpiece, and feeding the tool in a direction including at least the Z-axis direction. The feeding direction also includes so-called taper machining for feeding the tool slightly in the X-axis direction while feeding the tool in the Z-axis direction in addition to movement of only the Z axis.

Figure 6:
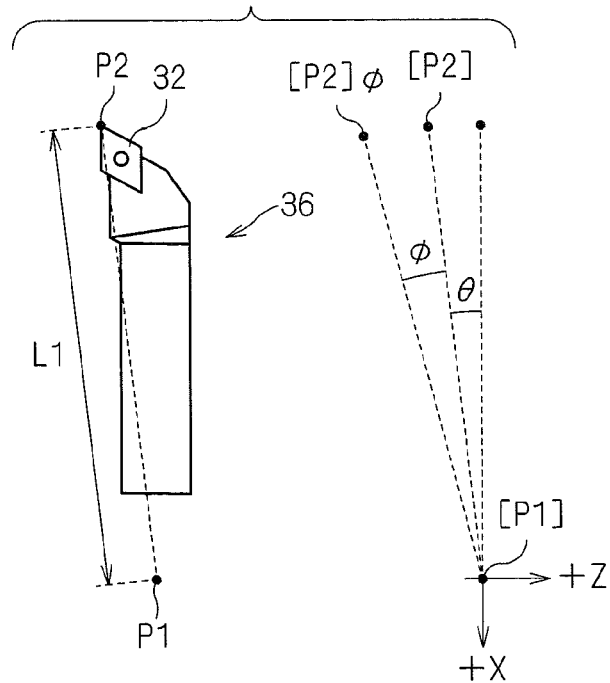
FIG. 6 is a view showing tool data according to the embodiment, and furthermore, a variation of a cutting edge position with B-axis inclined in accordance with an approach angle setting command amount.

The tool data 62 is data indicative of a cutting edge position of the tool. As shown in FIG. 6, it is assumed that the tool data 62 is data indicative of coordinate values, based on the B-axis center P1, of the cutting edge P2 of the insert 32 in the case where the tool holding unit 14 holding the cutting tool 36 is positioned at the origin of the B axis. Process using the tool data will be described later.

The interface 70 shown in FIG. 1 includes a display unit 72 and an input unit 74. Herein, the display unit 72 serves to visually notify an operator of various types of information. Moreover, the input unit 74 is a unit through which the operator carries out an input operation. Consequently, the operator can send a request to the turning control device 50. By the input operation of the input unit 74, it is possible to input the tool shape data 60, the tool data 62, the working program 64, and the thrust force data 68. However, part of data provided in the working program 64 can also be generated automatically by the turning control device 50. Moreover, the tool data 62 can also be measured automatically by using a sensor for detecting a cutting edge position.

The thrust force data 68 shown in FIG. 1 is data to be used for calculating the approach angle α at which the turning control device 50 sets, to zero, the thrust force to be applied to the workpiece 10 in the turning work.

Figure 7:
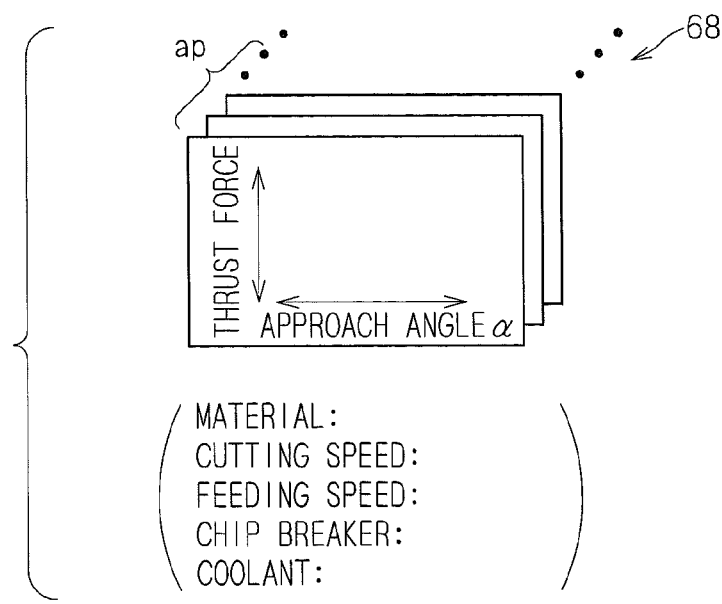
FIG. 7 is a view showing thrust force data according to the embodiment.

FIG. 7 shows the thrust force data 68. As shown, the thrust force data 68 is data in which a relationship between the approach angle α and the thrust force to be applied to the workpiece 10 is experimentally obtained for each cutting depth ap. However, the thrust force data for each cutting depth ap differs for each of a material, a cutting speed, and a feeding speed of the workpiece 10, presence or absence of a chip breaker of the insert 32, and whether or not a coolant has been used in the turning work. For this reason, strictly, it is necessary to experimentally obtain the relationship between the approach angle and the thrust force shown in FIGS. 5A and 5B for each of various conditions. Consequently, it is possible to calculate the approach angle α at which the thrust force is accurately set to zero. Even if simplified data, for example, thrust force data obtained by using a value of a typical cutting speed or feeding speed in use of a certain tool is applied to turning work having different cutting speeds or feeding speeds, however, it is sufficiently endurable to practical use as will be described later.

Figure 8:
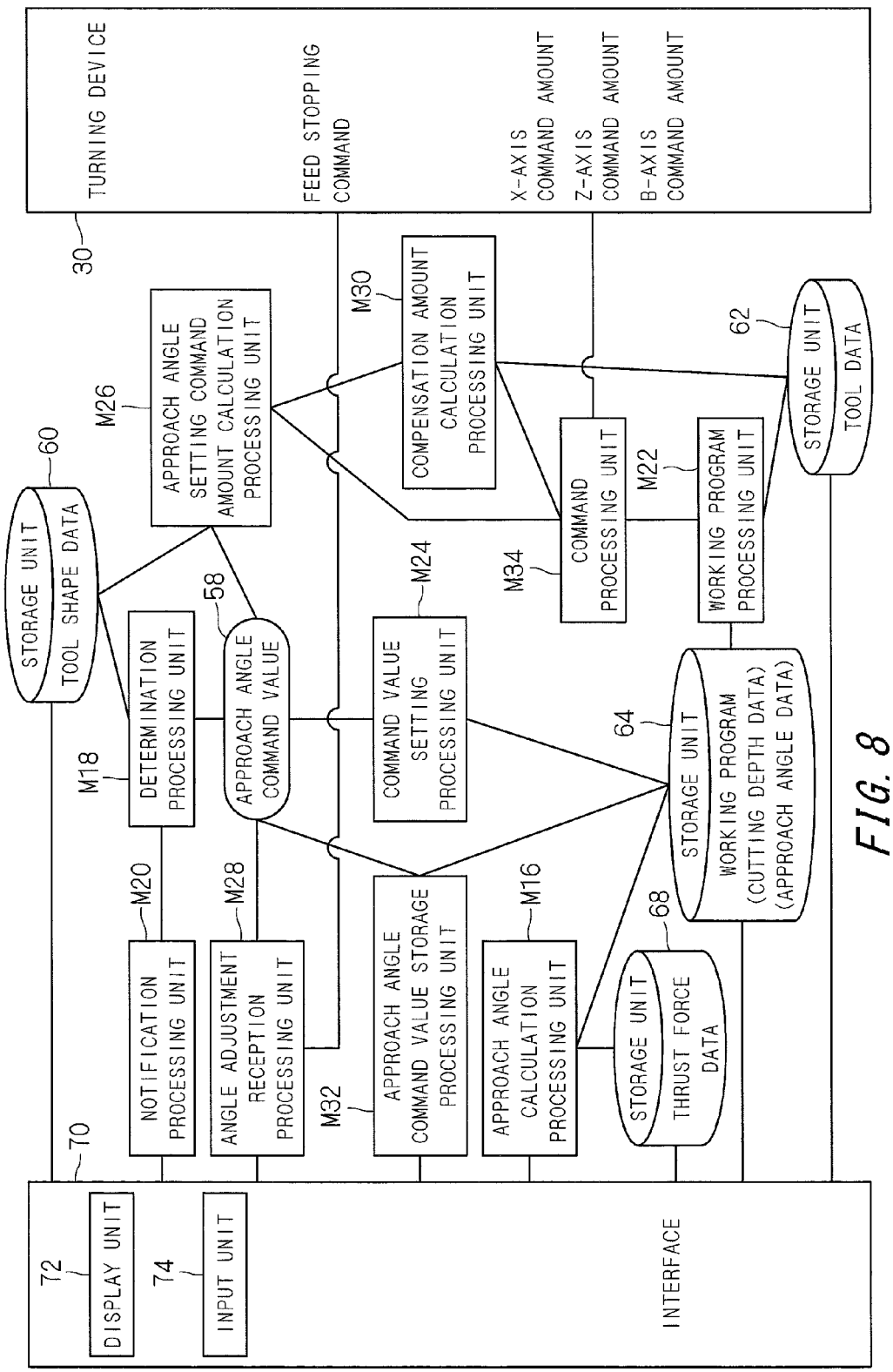
FIG. 8 is a functional block diagram showing a turning support program.
Figure 9:
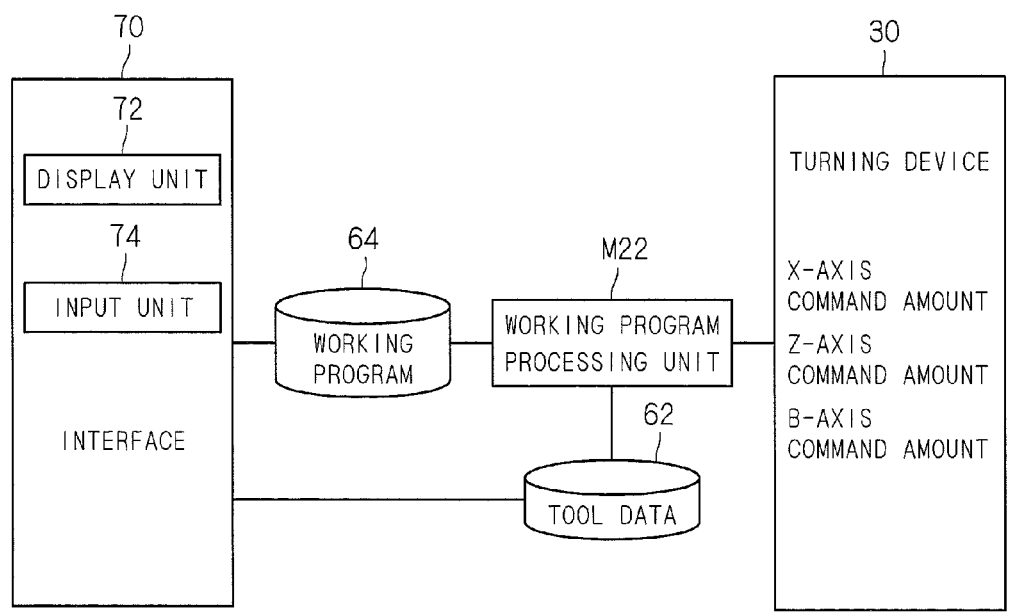
FIG. 9 is a functional block diagram related to control processing when performing turning work according to the related art.

FIG. 8 shows a functional block implemented by executing the turning support program 66 shown in FIG. 1 by the CPU 52. The functional block is implemented by transforming a functional block at the time of execution of a working program in a conventional general cutting control device shown in FIG. 9. As shown in FIG. 9, in the conventional functional block, a working program processing unit M22 refers to the working program 64 and the tool data 62, thereby making analysis and sequentially outputs a command amount of each axis for each working operation to the turning device 30 to perform the turning operation. Although the working program processing unit M22 according to the present embodiment has the same function as that in the related art and calculates and outputs a command amount of each axis for executing the working program, an output destination is different from that in the related art.

A command value setting processing unit M24 sets an approach angle command value 58.

An approach angle calculation processing unit M16 calculates the approach angle α at which the thrust force is zero based on the thrust force data 68, and registers the approach angle α as approach angle data into the working program 64.

A determination processing unit M18 determines whether or not approach angle data or the approach angle command value 58 set by the command value setting processing unit M24 is a value by which turning work can be carried out without occurrence of interference between the workpiece and the tool. If the determination processing unit M18 determines that the turning work cannot be carried out, a notification processing unit M20 outputs the determination to the display unit 72.

Upon receipt of a request for changing the approach angle from an operator during the execution of the working program 64, moreover, an angle adjustment reception processing unit M28 outputs a feed stopping command to the turning device 30 to interrupt the turning work, and then changes the approach angle command value 58 set by the command value setting processing unit M24, thereby changing a B-axis positioning angle.

An approach angle command value storage processing unit M32 registers the changed approach angle command value 58 as approach angle data into the working program 64.

An approach angle setting command amount calculation processing unit M26 calculates, as an approach angle setting command amount, the B-axis command amount for implementing the set or changed approach angle command value 58, and a compensation amount calculation processing unit M30 calculates an approach angle compensation amount for offsetting a displacement of a cutting edge position which is caused by inclining the tool holding unit 14 around the B axis in accordance with an approach angle setting command amount, and an operation compensation amount for offsetting a displacement of the cutting edge position which is caused by slightly inclining the B-axis corresponding to the approach angle command value 58 changed by the angle adjustment reception processing unit M28.

A command processing unit M34 outputs the approach angle setting command amount or the operation compensation amount to the turning device 30, or corrects the command amount of the X-axis driving unit 42 or the command amount of the Z-axis driving unit 44 for carrying out turning work which is an output of a working program processing unit M22 and outputs the corrected command amount to the turning device 30.

Next, processing of respective blocks will be described in detail with reference to FIGS. 10 to 20.

Figure 10:
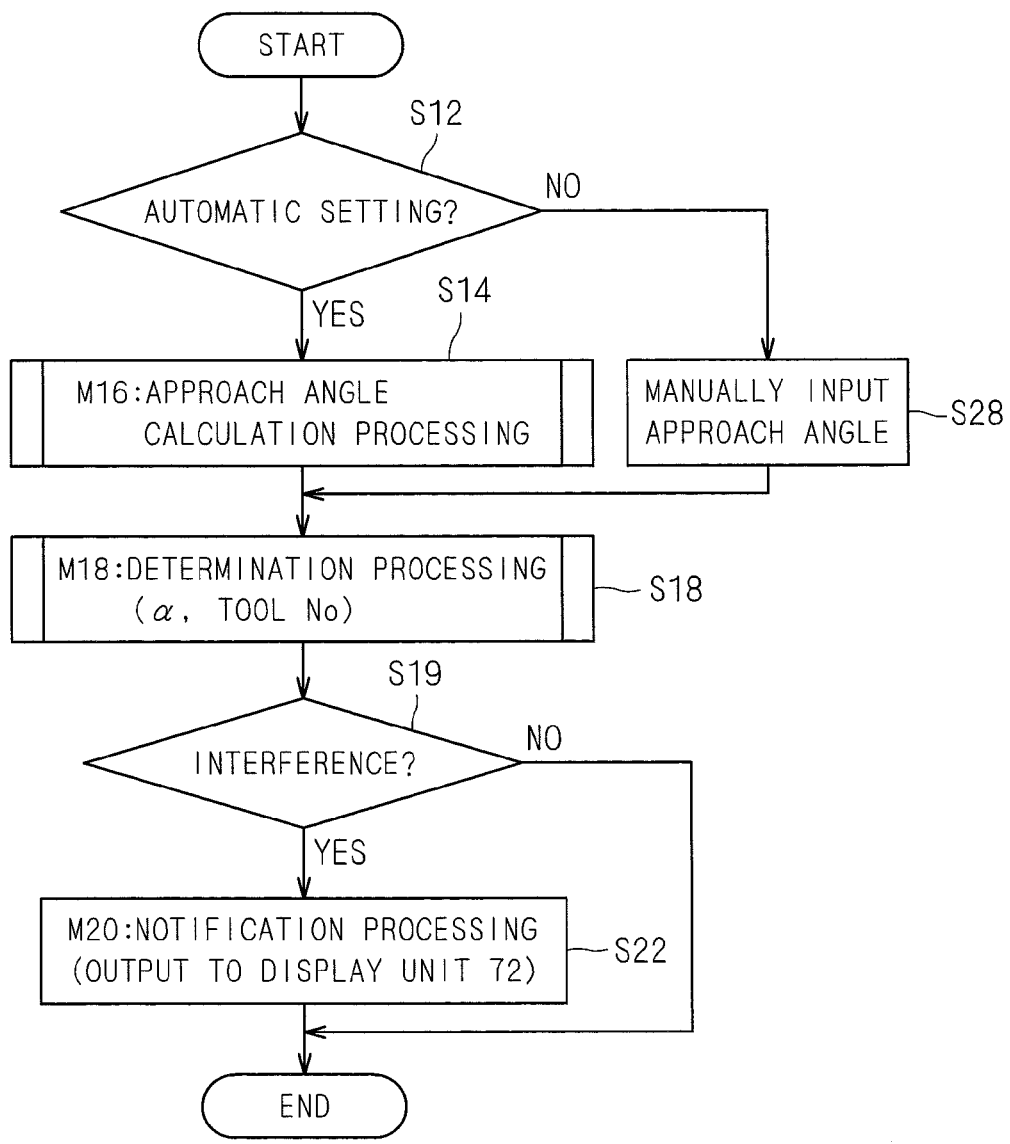
FIG. 10 is a flowchart showing a procedure for approach angle data set processing according to the embodiment.

FIG. 10 shows a procedure of processing for setting the approach angle data of the turning program which is mainly carried out by the approach angle calculation processing unit M16, the determination processing unit M18, and the notification processing unit M20. This processing is implemented by executing the turning support program 66 by the CPU 52.

The CPU 52 starts this processing when a request for setting the approach angle data is generated. In the present embodiment, for input of the approach angle data, one of automatic setting of the approach angle data utilizing the thrust force data 68 and an input operation of the approach angle data by the operator can be selected. For this reason, the CPU 52 first determines whether or not a request for automatically setting the approach angle data is made (S12). If the CPU 52 determines that the request for automatic setting is made (S12: YES), processing of the approach angle calculation processing unit M16 is started (S14).

Figure 11:
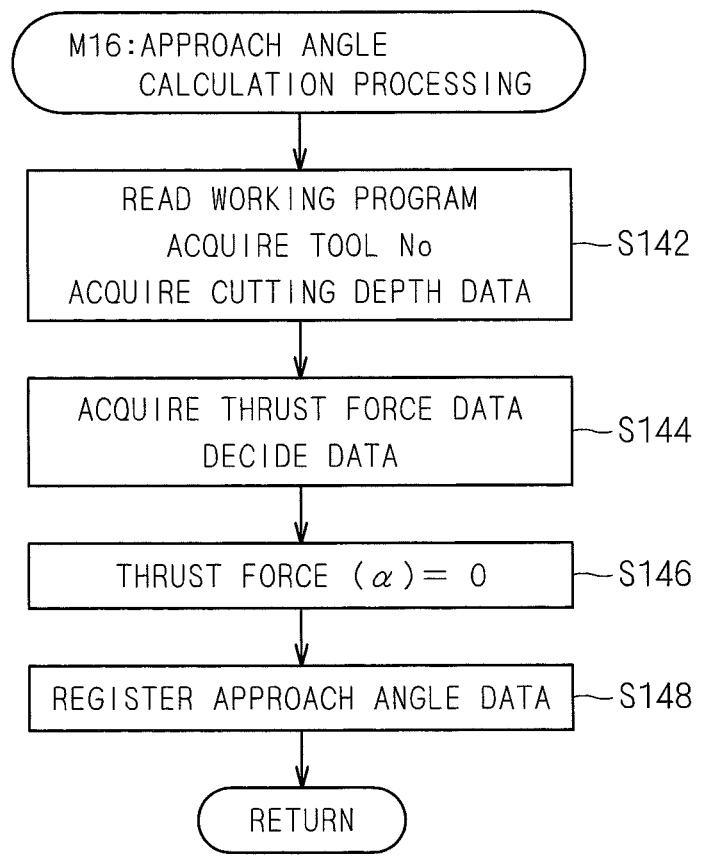
FIG. 11 is a flowchart showing a processing procedure for an approach angle calculation processing unit.

FIG. 11 shows the processing of the approach angle calculation processing unit M16 in detail. The CPU 52 acquires the working program 64, and acquires cutting depth data and a tool No of the tool to be used from the working program 64 (S142). Subsequently, the CPU 52 acquires the thrust force data 68 including a plurality of pieces of data in which the relationship between the approach angle α and the thrust force is obtained experimentally, and selects one of the plurality of pieces of data based on the cutting depth data and the tool No of the used tool in the working program 64 (S144). Then, the approach angle α at which the thrust force is zero is defined in this data (S146), and the approach angle α is registered as approach angle data into the working program 64 (S148).

On the other hand, if the CPU 52 determines that the request for automatic setting is not made in step S12 of FIG. 10 (S12: NO), input of the approach angle α through the input unit 74 is received, and the input approach angle α is registered into the working program 64 (S28).

When the approach angle data thus registered manually or automatically is actually applied to control, the CPU 52 causes the determination processing unit M18 to determine whether or not interference occurs between the cutting tool 36 and the workpiece 10 (S18).

Figure 12:
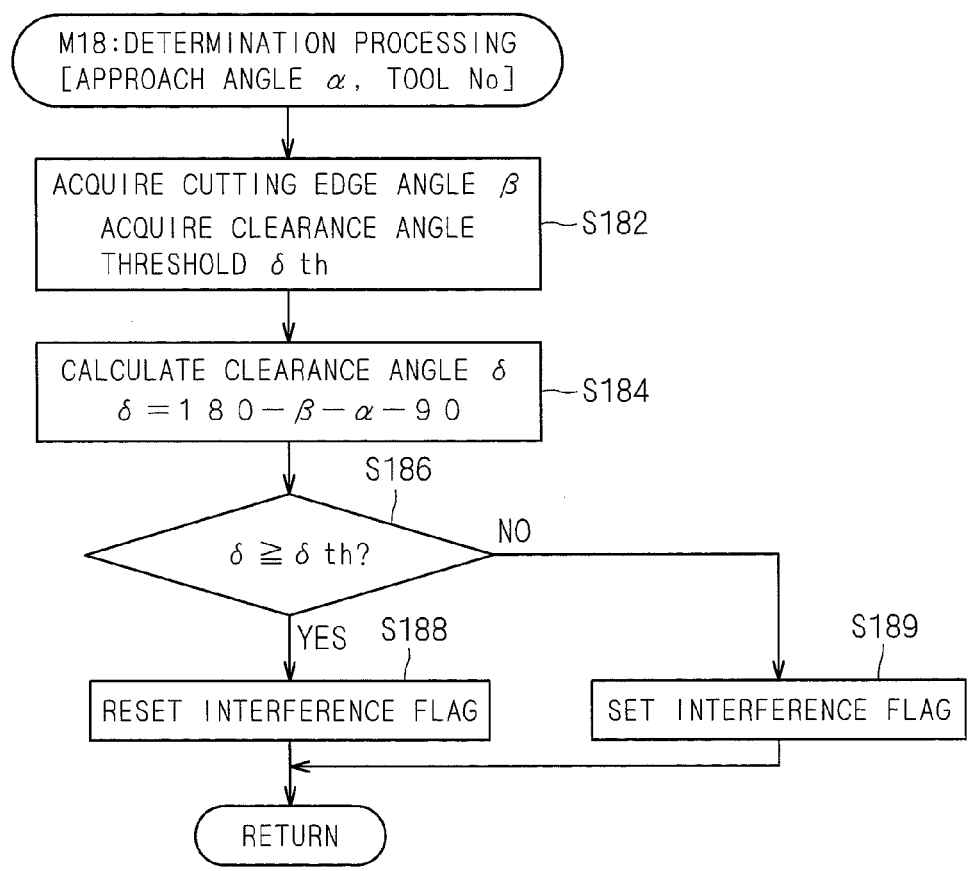
FIG. 12 is a flowchart showing a processing procedure for a determination processing unit.

FIG. 12 shows the details of the processing of the determination processing unit M18. The CPU 52 passes the approach angle α and the tool No as arguments when calling the determination processing unit M18, acquires a cutting edge angle β and a clearance angle threshold δth of the specified tool No (S182), and calculates a clearance angle δ (S184). Herein, the clearance angle δ can be calculated based on the cutting edge angle β and the approach angle α. Specifically, the clearance angle δ can be calculated in accordance with "δ=180−β−α−90" (Equation 1). Herein, the threshold δth defines a clearance between the cutting tool 36 and the workpiece, and is desirably set to a positive value which is equal to or greater than zero and close to zero.

Figure 13A:
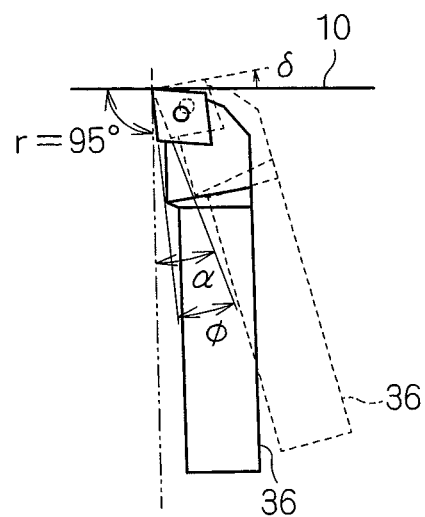
FIGS. 13A and 13B are views showing a technique for determining presence or absence of interference occurrence through an approach angle according to the embodiment.
Figure 13B:
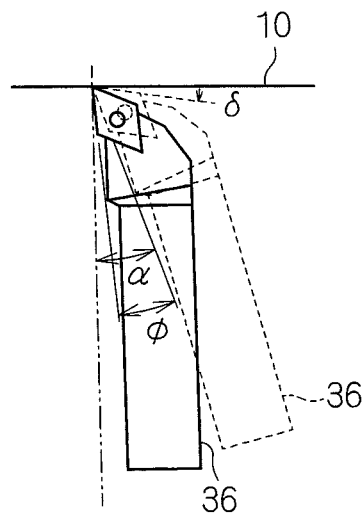

FIGS. 13A and 13B show an example of the determination processing. Specifically, FIG. 13A shows the case where the cutting edge angle β is 80°, the reference cutting angle γ is 95°, and the approach angle α is "24.23°". In this case, when the approach angle α is set to "24.23°" as shown in a broken line in FIG. 13A, the clearance angle δ obtained by the Equation 1 is "−14.23°", which is a value smaller than zero, and the cutting tool 36 interferes with the workpiece 10. In this case, therefore, it is determined that the turning work cannot be carried out. On the other hand, FIG. 13B shows the case where the cutting edge angle β is 55°, the reference cutting angle γ is 95°, and the approach angle α is "24.23° ". In this case, even if the approach angle α is set to "24.23°" as shown in a broken line in FIG. 13B, the clearance angle δ obtained by the Equation 1 is "10.77°", which is a value greater than zero, and the cutting tool 36 and the workpiece 10 do not interfere with each other. In this case, therefore, it is determined that the turning work can be carried out.

Returning to the description of the processing procedure, the CPU 52 determines whether or not the clearance angle δ as a result of the calculation is equal to or greater than the clearance angle threshold δth in order to determine the interference between the cutting tool 36 and the workpiece 10 in step S186 of FIG. 12. If it is determined that the clearance angle δ is smaller than the threshold δth (S186: NO), the CPU 52 determines that there is interference between the cutting tool 36 and the workpiece 10, and an interference flag is added to end the processing of the determination processing unit M18 (S189). On the other hand, if it is determined that the clearance angle δ is equal to or greater than a threshold θth (S186: YES), the CPU 52 determines that the interference does not occur and ends the processing of the determination processing unit M18 without the interference flag (S188).

Upon receipt of this result, the CPU 52 determines the presence or absence of the interference in step S19 of FIG. 10. If there is interference, that is, if the interference flag is set (S19: YES), the determination is output to the display unit 72 through the notification processing unit M20 and the operator is notified of the interference between the workpiece and the tool (S22).

If it is determined that the interference flag has been reset (S19: NO) and the processing of step S22 is completed, the CPU 52 ends this serial processing.

Figure 14:
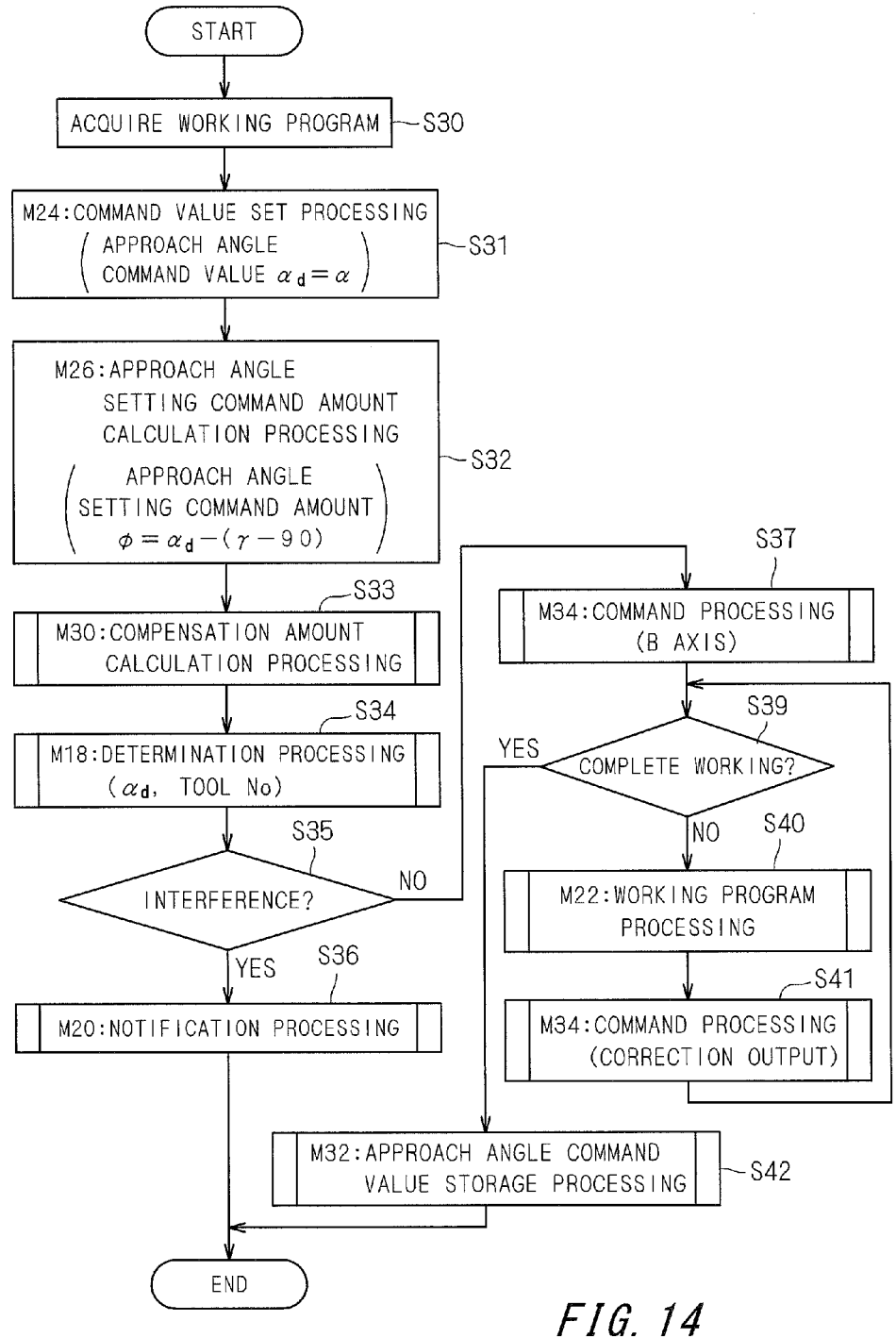
FIG. 14 is a flowchart showing a procedure for turning work processing according to the embodiment.

FIG. 14 shows the processing procedure for the turning work according to the present embodiment which is mainly carried out by the command value setting processing unit M24, the approach angle setting command amount calculation processing unit M26, the compensation amount calculation processing unit M30, the determination processing unit M18, the notification processing unit M20, the working program processing unit M22, the command processing unit M34, and the approach angle command value storage processing unit M32. This processing is implemented by executing the turning support program 66 by the CPU 52.

The CPU 52 first acquires the working program 64 (S30) and sets, to the approach angle command value 58, the approach angle data in the working program through the command value setting processing unit M24 (S31). Subsequently, the approach angle setting command amount calculation processing unit M26 is called to calculate a B-axis command amount for controlling the approach angle α to be the approach angle command value 58 (Step S32). Hereinafter, the B-axis command amount will be referred to as an approach angle setting command amount φ (see φ in FIGS. 13A and 13B). Herein, the approach angle setting command amount φ is calculated based on the approach angle command value 58 ("$α_d$" is used in the following equation) and the reference cutting angle γ. For example, in the case where the feeding direction of the cutting tool 36 and the axial center of the workpiece 10 are coincident with each other and the B-axis is positioned at the origin, the approach angle α is obtained as "α=γ−90" (Equation 2). By inclining the B axis from the origin in accordance with "φ=$α_d$−(γ−90)" (Equation 3), therefore, it is possible to control the approach angle α to be the approach angle command value 58 ($α_d$). Here, φ obtained by the Equation 3 is equivalent to the approach angle setting command amount φ.

Specific description will be given below with reference to FIG. 13A and 13B. In accordance with the Equation 2, the approach angle α with the tool holding unit 14 positioned at the origin of the B-axis is "5°" in FIGS. 13A and 13B. The approach angle setting command amount φ for setting the approach angle α to be "24.23°" of the approach angle command value 58 ($α_d$) is equal to "19.23°" in accordance with the Equation 3. In other words, it is possible to implement the instructed approach angle "24.23°" by inclining the B-axis in "19.23°". As is apparent from FIGS. 13A and 13B and the Equation 3, the approach angle setting command amount φ is decided by the reference cutting angle γ of the tool shape data 60 and the approach angle command value 58 ($α_d$).

When the tool holding unit 14 is inclined around the B axis in accordance with the approach angle setting command amount φ in order to control the approach angle α to be the approach angle command value 58 ($α_d$), the cutting edge P2 of the cutting tool 36 is displaced in the X-axis direction and the Z-axis direction depending on a distance between the B-axis center P1 of the tool holding unit 14 and the cutting edge P2 of the cutting tool 36 held by the tool holding unit 14. Data for compensating the displacement is referred to as an approach angle compensation amount, which includes an approach angle X-axis compensation amount for compensating the displacement in the X-axis direction and an approach angle Z-axis compensation amount for compensating the displacement in the Z-axis direction. The CPU 52 calls the compensation amount calculation processing unit M30 in step S33, and calculates the approach angle compensation amount based on the tool data 62. A method of calculating the approach angle compensation amount will be described below in detail.

FIG. 6 shows a positional relationship between the cutting edge P2 and the B-axis center P1. For example, the coordinate values of the cutting edge P2 of the tool based on the B-axis center P1 is registered in the tool data before the turning work. In FIG. 6, [P1] represents a position of the B-axis center P1, [P2] represents a position of the cutting edge P2 of the tool with the tool holding unit 14 placed at the origin of the B-axis, and $[P2]_φ$ represents a position of the cutting edge P2 of the tool with the tool holding unit 14 inclined around the B axis in accordance with the approach angle setting command amount φ. When the respective positions are expressed as [P1]=(0, 0), [P2]=(X2, Z2), and $[P2]_φ=(X2_φ, Z2_φ)$ in a coordinate system based on the B-axis center P1, it is possible to obtain, with the following equations, a displacement amount $ΔX_φ$ in the X-axis direction, a displacement amount $ΔZ_{100}$ in the Z-axis direction, and an approach angle X-axis compensation amount $ηX_φ$, and an approach angle Z-axis compensation amount $ηZ_φ$ from the cutting edge position [P2] before setting the approach angle command value 58 ($α_d$) to the cutting edge position $[P2]_{100}$ after the setting. In the following equations, L1 represents a length between the cutting edge P2 and the B-axis center P1, and θ represents a B-axis angle position of the cutting edge P2 when the tool holding unit 14 is positioned at the origin of the B-axis, which is obvious from the equations.

$$L1=\sqrt{(X2^2+Z2^2)} \quad \text{(Equation 4)},$$

$$θ=\tan^{-1}(Z2/X2) \quad \text{(Equation 5)},$$

$$X2_φ=L1×\cos(θ+φ) \quad \text{(Equation 6)},$$

$$Z2_φ=L1×\sin(θ+φ) \quad \text{(Equation 7)},$$

$$ΔX_φ=X2_φ-X2 \quad \text{(Equation 8)},$$

$$ΔZ_φ=Z2_φ-Z2 \quad \text{(Equation 9)},$$

$$ηX_φ=-ΔX_φ \quad \text{(Equation 10)},$$

$$ηZ_φ=-ΔZ_φ \quad \text{(Equation 11)}.$$

Figure 15:
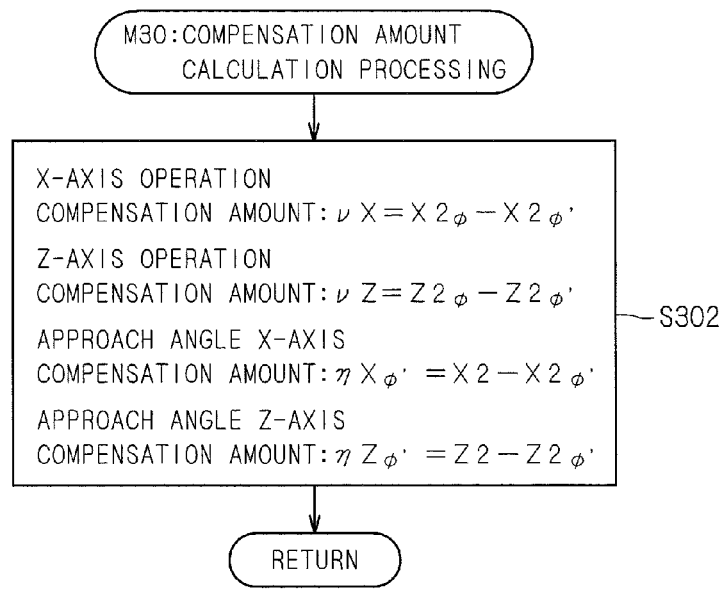
FIG. 15 is a flowchart showing a processing procedure for a compensation amount calculation processing unit.

$X2_φ$ and $Z2_φ$ can be obtained by the tool data (X2, Z2) and the approach angle setting command amount φ in accordance with the equations described above. FIG. 15 illustrates a processing procedure for the compensation amount calculation processing unit M30, and also shows equations for an X-axis operation compensation amount vX and a Z-axis operation compensation amount vZ described in detail in the description of an approach angle manual fine adjusting function shown in FIG. 18 which will be described later. Herein, since the approach angle manual fine adjustment is not carried out, φ=φ' and $vX=X2_φ-X2_{φ'}=X2_φ-X2_φ=0$, $vZ=Z2_φ-Z2_{φ'}=Z2_φ-Z2_φ=0$, $ηX_{φ'}=X2-X2_{φ'}=X2-X2_φ=ηX_{100}$, $ηZ_{100}=Z2-Z2_{φ'}=Z2-Z2_φ=ηZ_φ$.

The approach angle X-axis compensation amount $ηX_φ$ and the approach angle Z-axis compensation amount $ηZ_φ$ thus obtained serve to cancel the displacement of the position of the cutting edge P2 which is caused by setting the approach angle command value 58 ($α_d$). Consequently, the approach angle compensation amount is added to a working command amount processed without consideration of the approach angle, and the added amount is output. Thus, it is possible to correct a displacement generated by inclining the B-axis in accordance with the approach angle setting command amount φ.

Next, the CPU 52 confirms whether or not the acquired working program 64 can be operated normally. In this example, the determination processing unit M18 is called in step S34 to confirm the presence or absence of the interference between the cutting tool 36 and the workpiece 10. Since this processing is different only in that the content described in FIG. 12 and an argument to be passed are the approach angle command value $\alpha_d$, the description will be omitted.

The CPU 52 determines whether or not it is found that the cutting tool 36 interferes with the workpiece 10 during the turning work by the processing of the determination processing unit M18 (S35). If it is determined that the interference occurs (S35: YES), the data indicative of the determination is output to the display unit 72 (S36), and the operator is notified of the interference between the workpiece and the tool.

On the other hand, if it is determined that interference does not occur (S35: NO), the CPU 52 calls the command processing unit M34 (S37). Consequently, the CPU 52 outputs the approach angle setting command amount φ calculated by the approach angle setting command amount calculation processing unit M26 to the B-axis driving unit 46 of the turning device 30 by processing shown in FIG. 16 (S804). Then, the CPU 52 repeats the processing in steps S40 and S41 in FIG. 14 until the data of the working program 64 ends.

A serial procedure is programmed into the working program 64. In the serial procedure, the spindle holding the workpiece is rotated at a specified rotation speed and a tool to be used is found and is positioned up to a turning start position by fast forwarding, and the intended turning work is then performed, the tool holding device is returned to a mechanical origin also after the turning work, and the rotation of the spindle is stopped to end the processing. The CPU 52 calls the working program processing unit M22 in step S40, and calculates a command amount for executing the turning work in accordance with the working program 64 for every working operation, and outputs the command amount (FIG. 17: S402). The command processing unit M34 is continuously called (S41). Consequently, through the processing shown in FIG. 16, the CPU 52 adds the approach angle X-axis compensation amount $\eta X_\varphi$ and the approach angle Z-axis compensation amount $\eta Z_\varphi$ which are previously calculated by the compensation amount calculation processing unit M30 in step S33 to the X-axis and Z-axis command amounts output from the working program processing unit M22, and outputs the result (S806).

If it is determined that the processing of all the steps in the working program is completed (S39: YES), the CPU 52 performs the processing of the approach angle command value storage processing unit M32 (S42). Herein, the approach angle manual fine adjusting function will be described earlier.

Chatter is caused by the thrust force during the turning work in some cases. A function of manually and finely adjusting the approach angle is prepared in such a manner that the operator who noticed the chatter can easily change the approach angle command value 58 ($\alpha_d$) and perform the B-axis inclining movement for the tool holding unit 14 associated therewith.

Figure 18:
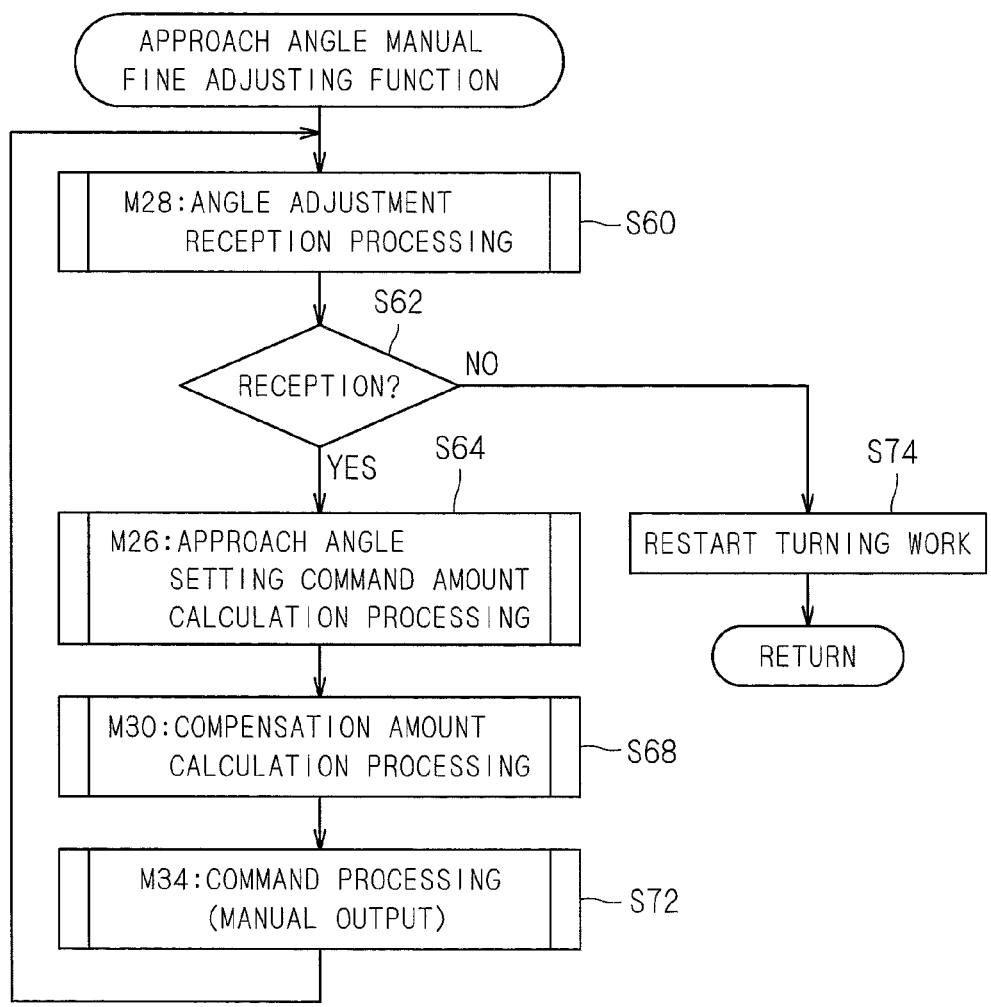
FIG. 18 is a flowchart showing a processing procedure for angle adjustment of the approach angle according to the embodiment.

FIG. 18 shows a procedure for the approach angle change processing in the approach angle manual fine adjusting function which is mainly performed by the angle adjustment reception processing unit M28, the approach angle setting command amount calculation processing unit M26, the compensation amount calculation processing unit M30, and the command processing unit M34. This processing is implemented by executing the turning support program 66 by the CPU 52.

The operator who detected the chatter during the turning work turns ON a switch for requesting to manually change the approach angle command value 58 ($\alpha_d$), so that the CPU 52 starts the processing of FIG. 18.

Figure 19:
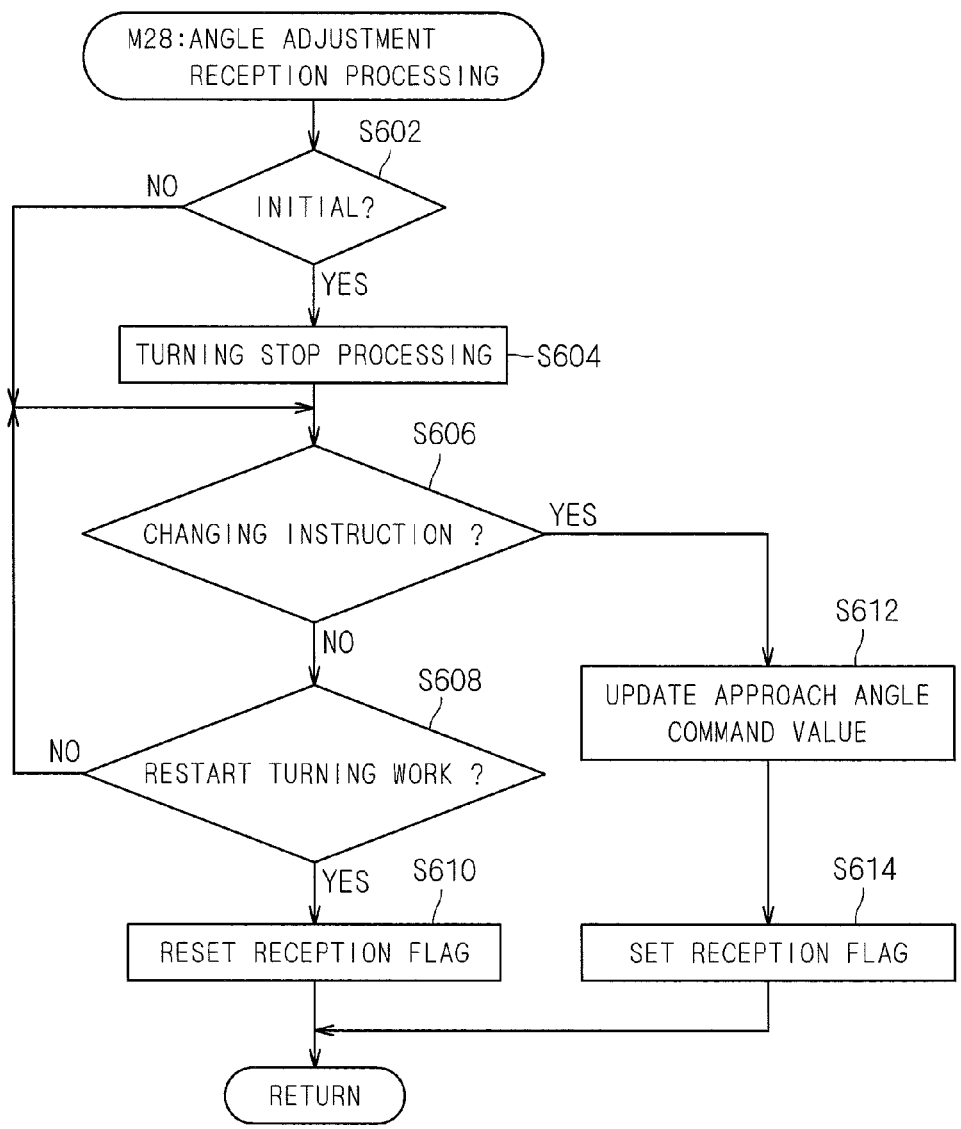
FIG. 19 is a flowchart showing a processing procedure for an angle adjustment reception processing unit.

First of all, the angle adjustment reception processing unit M28 is called (S60). FIG. 19 shows the details of the angle adjustment reception processing unit M28. The angle adjustment reception processing unit M28 first outputs a feed stopping command to the turning device 30 to stop feeding of the cutting tool 36 in the Z-axis direction, and once interrupts the turning work (S604). Then, the CPU 52 determines whether or not an instruction to change the approach angle command value 58 ($\alpha_d$) through an input operation to the input unit 74 is given (S606), or whether or not an instruction to restart the turning work is given (S608). It is preferable to implement the instruction to change the approach angle command value 58 ($\alpha_d$) by providing a hand pulse to the input unit 74. The hand pulse is an interface which is manually rotated by the operator, and the number of pulses corresponding to an amount of the rotating operation is output to change the approach angle command value 58 ($\alpha_d$) corresponding to the number of the output pulses. As a matter of course, it is not essential that the input unit 74 is provided with the hand pulse. For example, the input unit 74 may actually input an instruction value of a correction angle as a numerical value. Moreover, an ordinary automatic operation starting switch may also be used for the instruction to restart the turning work.

If it is determined that the instruction to change the approach angle command value ($\alpha_d$) is given (S606: YES), the CPU 52 receives the changing instruction input to the input unit 74 to update the approach angle command value 58 ($\alpha_d \rightarrow \alpha_d'$) (S612). Hereinafter, a value which has not been updated will be described as "$\alpha_d$" and an updated value will be described as "$\alpha_d'$". Then, a flag of "reception" is set to end the processing of M28 (S614). If it is determined that the instruction to restart the turning work is given (S608: YES), the flag of "reception" is reset to end the processing of M28 (S610).

The approach angle manual fine adjusting function can change the approach angle command value 58 ($\alpha_d$) many times after a switch for requesting to change the approach angle command value 58 ($\alpha_d$) is turned ON to carry out turning stop processing and until the turning work is restarted. For this reason, the approach angle manual fine adjusting function includes step S602 for determining whether or not the processing is initial processing.

Next, the CPU 52 determines whether or not the change instruction is received during the angle adjustment reception processing in step S62 of FIG. 18. If it is determined that the change instruction is received, that is, if the flag of "reception" is set (S62: YES), an approach angle setting command amount φ' is calculated based on the changed approach angle command value 58 ($\alpha_d'$) which is received (S64). From the Equation 3, $\varphi' = \alpha_d' - (\gamma - 90)$ is obtained.

Subsequently, the CPU 52 calls the compensation amount calculation processing unit M30 (S68).

In addition to the calculation of the approach angle compensation amount described above, the compensation amount calculation processing unit M30 also calculates an operation compensation amount for compensating the displacement in the XZ plane of the cutting edge P2 through inclination of the tool holding unit 14 around the B-axis based on a changing amount of the approach angle command value which is changed by the approach angle manual fine adjusting function. An X-axis direction component and a Z-axis direction component in the operation compensation amount are referred to as an X-axis operation compensation amount and a Z-axis operation compensation amount, respectively.

When the approach angle command value 58 ($\alpha_d$) is set, the position of the cutting edge P2 of the tool with the tool holding unit 14 inclined around the B axis in accordance with the approach angle setting command amount φ is set to be [P2]$_\varphi$=(X2$_\varphi$, Z2$_\varphi$) in the same manner as described above, and the position of the cutting edge P2 of the tool when the approach angle setting command amount is changed from φ to φ' by the approach angle manual fine adjusting function is set to be [P2]$_{\varphi'}$=(X2$_{\varphi'}$, Z2$_{\varphi'}$), the displacement amount τX in the X-axis direction, the displacement amount τZ in the Z-axis direction, the X-axis operation compensation amount νX, and the Z-axis operation compensation amount νZ through the approach angle manual fine adjustment can be obtained by the following equations. In order to clearly show that the approach angle compensation amount in the approach angle setting command amount φ' is different from that in the approach angle setting command amount φ, the approach angle X-axis compensation amount is represented by ηX$_{100}$' and the approach angle Z-axis compensation amount is represented by ηZ$_{\varphi'}$.

$$X2_{\varphi'}=L1\times\cos(\theta+\varphi') \quad \text{(Equation 12)},$$

$$Z2_{\varphi'}=L1\times\sin(\theta+\varphi') \quad \text{(Equation 13)},$$

$$\tau X=X2_{\varphi'}-X2_\varphi \quad \text{(Equation 14)},$$

$$\tau Z=Z2_{\varphi'}-Z2_\varphi \quad \text{(Equation 15)},$$

$$\nu X=-\tau X \quad \text{(Equation 16)},$$

$$\nu Z=-\tau Z \quad \text{(Equation 17)},$$

$$\Delta X_{\varphi'}=X2_{\varphi'}-X2 \quad \text{(Equation 18)},$$

$$\Delta Z_{\varphi'}=Z2_{\varphi'}-Z2 \quad \text{(Equation 19)},$$

$$\eta X_{\varphi'}=-\Delta X_{\varphi'} \quad \text{(Equation 20)},$$

$$\eta Z_{\varphi'}=-\Delta Z_{\varphi'} \quad \text{(Equation 21)}.$$

The equations are described briefly in FIG. 15. By the Equations 4 to 21, X2$_\varphi$, Z2$_\varphi$, X2$_{\varphi'}$, and Z2$_{\varphi'}$ can be obtained based on the tool data (X2, Z2), the latest approach angle setting command amount φ, and the approach angle setting command amount φ' after the manual operation.

The X-axis operation compensation amount νX and the Z-axis operation compensation amount νZ thus obtained serve to cancel the displacement of the cutting edge position which is caused by changing the approach angle command value through the approach angle manual fine adjusting function.

Figure 16:
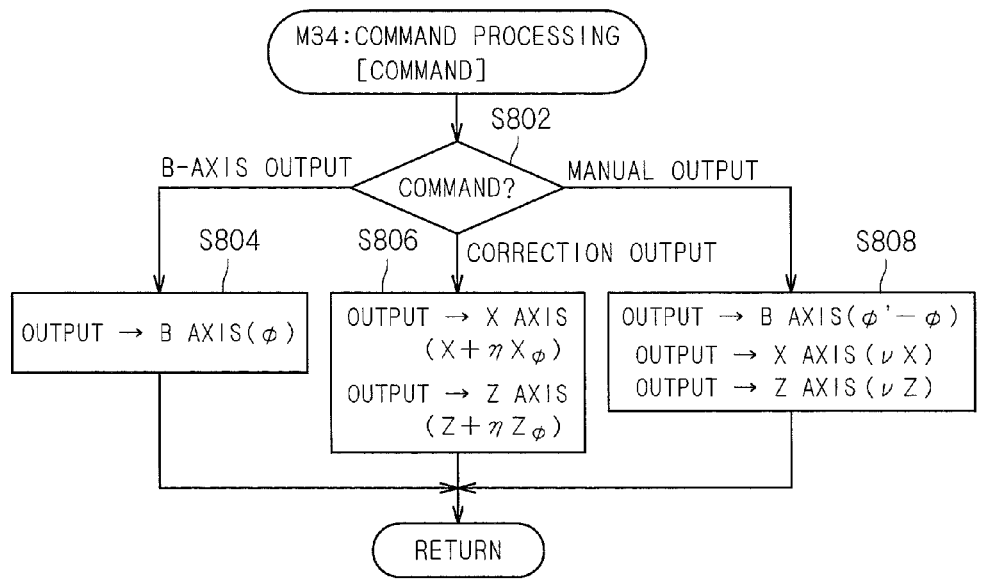
FIG. 16 is a flowchart showing a processing procedure for a command processing unit.
Figure 17:
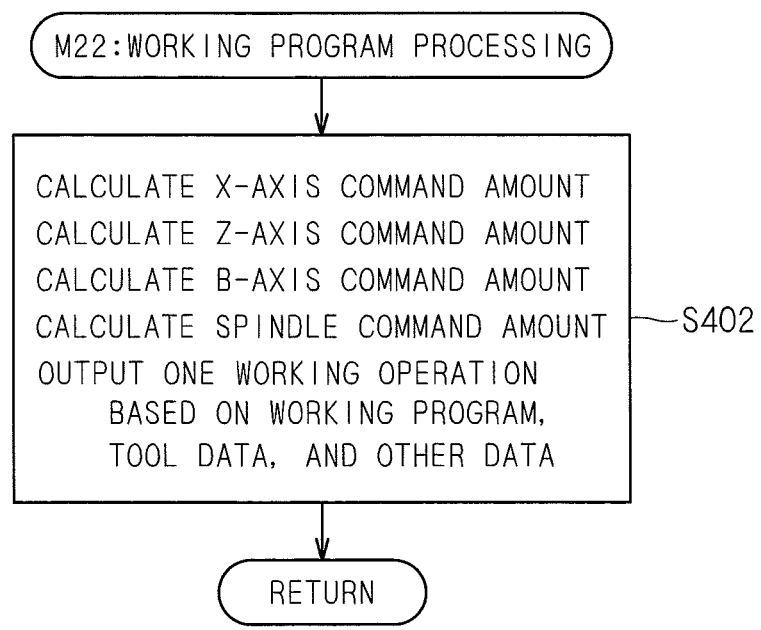
FIG. 17 is a flowchart showing a processing procedure for a working program processing unit.

Then, the CPU 52 calls the command processing unit M34 shown in FIG. 16 (S72). Consequently, the approach angle setting command amount φ' ((φ'−φ) for the B-axis displacement amount) calculated in step S64 and the X-axis operation compensation amount νX and the Z-axis operation compensation amount νZ calculated in step S68 are simultaneously output to the B-axis driving unit 46, the X-axis driving unit 42, and the Z-axis driving unit 44 in the turning device 30 (S808). Consequently, it is possible to change the approach angle α without changing the X-axis coordinate value and the Z-axis coordinate value of the cutting edge P2. At this time, the main cutting edge portion 32b of the tool may break into the workpiece by inclining the B axis. However, since the rotation of the spindle is not stopped, cutting is simply performed in a very small amount, which does not cause a problem.

Herein, further details are given on the command processing unit M34. The command processing unit M34 has a function of outputting a command amount to each of the driving units 40, 42, 44, and 46 of the turning device 30. When the command processing unit M34 is to be called (S37, S41, S72), a command code is passed as an argument to switch the processing of the command processing unit M34 (5802). In FIG. 16, for easy understanding, the command code is described as "B-axis output", "correction output", and "manual output".

If it is determined that the change instruction is not received, that is, if the flag of "reception" is reset in step S62 of FIG. 18 (S62: NO), then, the execution of the working program stopped by the angle adjustment reception processing unit M28 is restarted (S74) to end the processing of the approach angle manual fine adjusting function.

Consequently, the processing of steps S40 and S41 in FIG. 14 is restarted with correction into the approach angle command value 58 ($\alpha_d$'), the approach angle setting command amount φ', the approach angle X-axis compensation amount ηX$_{\varphi'}$, and the approach angle Z-axis compensation amount ηZ$_{\varphi'}$ by the processing of FIG. 18, respectively. In other words, the subsequent turning work is performed with the manually fine adjusted approach angle command value 58 ($\alpha_d$').

Figure 20:
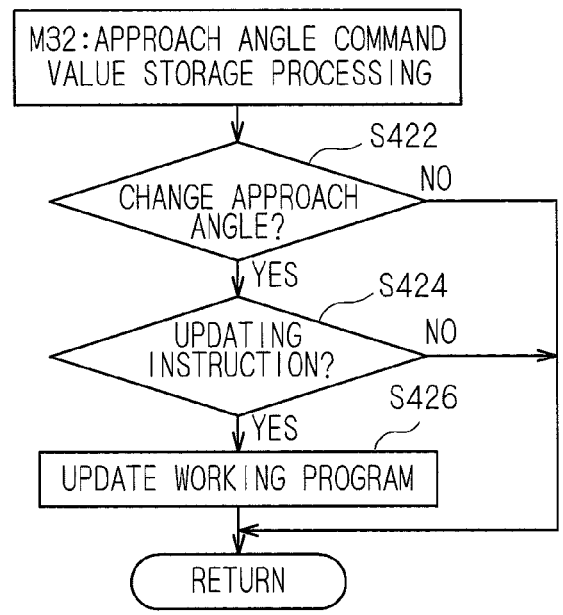
FIG. 20 is a flowchart showing a processing procedure for an approach angle command value storage processing unit.

When the turning work is completed (S39 in FIG. 14: YES), the CPU 52 calls the approach angle command value storage processing unit M32 (S42). In other words, it is determined whether or not the processing of FIG. 20 is operated to change the approach angle (S422). If it is determined that the approach angle is changed (S422: YES), the CPU 52 determines whether or not an operation to update the approach angle data in the working program 64 is performed by the input operation to the input unit 74 (S424).

If the CPU 52 determines that the approach angle is changed, specifically, a message of "Register the changed approach angle into the working program?" is displayed on the display unit 72. Thereafter, if the input unit 74 is operated correspondingly by the operator, the CPU 52 determines that an instruction to update the approach angle data in the working program 64 is given (S424: YES), and updates the approach angle data in the working program 64 into the approach angle command value 58 ($\alpha_d$') which is currently set (S426). In other words, the approach angle command value 58 ($\alpha_d$') used finally in the turning work at this time is registered into the working program 64 as the approach angle data.

According to this serial processing, when the chatter occurs, the operator interrupts the turning work and gives an instruction to change the approach angle command value 58 ($\alpha_d$). Then, when the turning work corresponding to the change is performed to suppress the chatter, an operation to update the approach angle data in the working program 64 to the approach angle command value 58 ($\alpha_d$') is carried out so that the updated approach angle command value 58 ($\alpha_d$') is continuously employed for subsequent turning work of the workpiece 10. For this reason, in the case where the plurality of workpieces 10 having the same specification are subjected to turning work, the chatter does not occur in the subsequent turning work if the chatter does once stops occurring. Moreover, by effectively using this function, it is possible to comparatively quickly find the approach angle α at which the chatter does not occur even if data perfectly adapted to the working condition at this time is not present in the thrust force data 68. Thus, it is possible to rapidly achieve the turning work without the chatter.

<Other Embodiments>

The above-described embodiments may be changed and implemented in the following manner.

"Regarding a Countermeasure to be Taken when the Approach Angle Data is not Present in the Working Program"

The conventional working program has no concept of the approach angle data. For this reason, the data is not present in the working program. However, it is preferable that even such a working program is provided with a region for setting approach angle data in a parameter region where an operator can carry out input, and to treat data as the approach angle data when the data is present in this region.

In this case, the command value setting processing unit M24 sets the approach angle command value 58 ($\alpha_d$) by using parameter data defined as the approach angle data. Moreover, in the approach angle calculation processing unit M16, the approach angle data for causing the obtained thrust force to be zero is set to the parameter data.

"Regarding the Approach Angle Calculation Processing Unit"

For example, the approach angle calculation processing unit is not restricted to a unit using thrust force data in which a relationship between the thrust force and the approach angle is defined, but may calculate, by physical calculation, an approach angle at which the thrust force F1 and the thrust force F2 shown in FIG. 4 are equal to each other.

It is not essential that the thrust force is set to zero, but it is sufficient that an approach angle which is equal to or smaller than an upper limit value of the thrust force required to satisfy turning accuracy is calculated.

"Regarding the Determination Processing Unit"

Figure 21A:
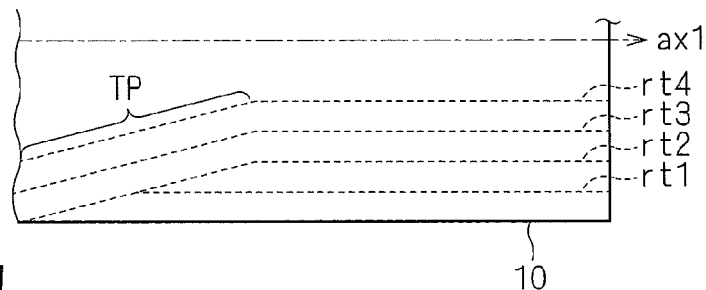
FIGS. 21A and 21B are side views showing turning work according to a variant of the embodiment.
Figure 21B:
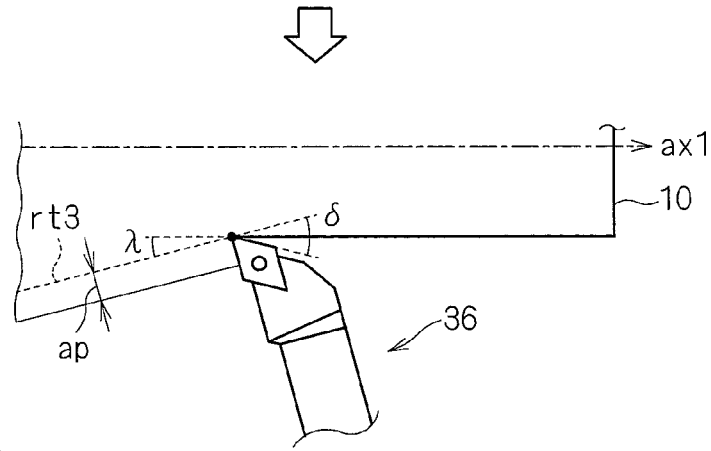

The determination processing unit is not limited to a unit which determines the presence or absence of interference based on only the clearance angle δ. FIGS. 21A and 21B show an example of turning work in which elements other than the clearance angle δ are to be taken into consideration. FIG. 21A shows an example in which the cutting tool 36 is moved in order of four turning routes rt1, rt2, rt3, and rt4 to carry out the turning work. In this example, a final shape indicated as the turning route rt4 has a tapered portion TP. For this reason, it is impossible to avoid a fluctuation in the cutting depth ap in the working of the tapered portion TP. In this example, therefore, the cutting depth in the tapered portion TP is caused to fluctuate in an initial stage of the turning work (the turning routes rt1 and rt2). Consequently, it is possible to fix the cutting depth ap in the tapered portion TP in a latter stage of the turning work (the turning routes rt3 and rt4).

FIG. 21B shows a point where the cutting tool 36 is moved to the tapered portion TP, particularly, in the turning route rt3. Herein, the cutting depth ap is defined as a length in a direction orthogonal to a relative feeding direction of the cutting tool 36 with respect to the workpiece 10. On the other hand, the approach angle α is an angle formed by the main cutting edge portion 32b with respect to the direction orthogonal to the relative feeding direction. Herein, when the angle (a taper angle λ) of the tapered portion TP is used, the clearance angle δ is "90−α−β". Even if the clearance angle δ is greater than zero at an end of the tapered portion TP, however, the cutting tool 36 may interfere with portions other than the tapered portion TP in the workpiece 10. For this reason, it is desirable to determine the presence or absence of the interference depending on whether or not a value "(90−α−β) −λ" obtained by subtracting the taper angle λ from the clearance angle δ is equal to or greater than the clearance angle threshold δth.

In the example shown in FIGS. 21A and 21B, it is possible to fix the cutting depth ap in the tapered portion TP in the latter stage of the turning work (the turning routes rt3 and rt4) in which a turning diameter is reduced and the thrust force tends to become a problem. For this reason, in the latter stage of the turning work in which the thrust force tends to become a problem, it is possible to set the approach angle α corresponding to the cutting depth ap, and furthermore, to suitably suppress the influence of the thrust force based on the shape obtained after the turning work for the workpiece 10.

"Regarding the Compensation Amount Calculation Processing Unit"

In the above-described embodiments, the approach angle α is changed in the state where the feeding during the turning work is stopped and the cutting edge of the tool is thus in contact with the workpiece. In other words, although the X-axis operation compensation amount and the Z-axis operation compensation amount are calculated in addition to the approach angle setting command amount φ, and the calculated amounts are simultaneously output so that the approach angle can be changed without changing the cutting edge position, the embodiment of the present invention is not limited thereto. For example, when stopping the turning work, it is also possible to once displace the cutting tool 36 greatly in the X-axis direction in order to separate the cutting tool 36 from the workpiece 10. In this case, it is preferable to perform processing for inclining the cutting tool 36 in the B-axis direction with the cutting tool 36 separated from the workpiece 10, and displacing the cutting tool 36 in the X-axis direction and the Z-axis direction reversely to the displacements in the X-axis direction and the Z-axis direction which are caused by the inclination of the cutting tool 36, and to then restart the turning work. In this case, for example, it is preferable to store a position where the turning work is interrupted, and to automatically insert a path from the position at the restart of the turning work to the stored turning interruption position.

The processing for changing the approach angle α is not limited to processing to be performed with the tool holding device 16 stopped. For example, the approach angle α may be changed with the tool holding device 16 operated in the Z-axis direction. In this case, it is sufficient to perform processing for offsetting the Z-axis operation compensation amount in the feed processing in the Z-axis direction.

"Regarding an Instruction for Interruption and an Instruction to Change"

The instruction is not limited to an instruction given by an input operation through the input unit 74 by an operator. For example, it is also possible to provide a device for detecting chatter and to output, from the device, the instruction for interruption or the instruction to change the approach angle. As the device for detecting the chatter, herein, it is preferable to employ a device for inputting a sound or a vibration and determining that the chatter occurs by excess of a predetermined frequency noise over a threshold, for example. As a matter of course, in addition thereto, it is also possible to photograph the workpiece during the turning work and to detect the chatter as a result of image analysis. Furthermore, it is also possible to employ a device provided with a sensor for detecting a load to be applied to a tool and serving to detect the chatter based on an output value of the sensor, for example. In this case, information about a proper approach angle α can be newly acquired by actual turning work. Therefore, the thrust force data 68 can be updated successively.

As a device for giving the changing instruction after the detection of the chatter, for example, it is preferable to employ a device for giving an instruction to change the approach angle in a predetermined amount ω in a positive (negative) direction, and giving an instruction to change the approach angle in the predetermined amount ω in the negative (positive) direction if the chatter is not suppressed as a result. In this case, if the chatter is suppressed but is not suppressed sufficiently, it is preferable to further give an instruction to change the approach angle in the predetermined amount ω in the same direction.

"Regarding the Approach Angle Command Value Storage Processing Unit"

For example, in the case where a cutting depth is changed for a single workpiece to perform the turning work a plurality of times, that is, a first cutting depth is set in a first turning work and a second cutting depth is set in a second turning work in the working for the single workpiece, it is desirable to register each of the approach angle command values 58 (ad) for each cutting depth into the working program 64.

"Regarding the Turning Support Program"

Instead of setting all of the processing in FIGS. 10, 14, and 18 as software processing (processing to be implemented by executing the turning support program 66 by the CPU 52), it is also possible to set a part or all of the processing in FIGS. 10, 14, and 18 as hardware processing by dedicated hardware means.

Moreover, the turning support program is not limited to a program incorporated into the turning control device for implementing all of the processing in FIGS. 10, 14, and 18. For example, it is also possible to implement only the processing in FIGS. 10 and 14 as a program for supporting the operation of the turning device capable of displacing the cutting tool 36 in the X-axis direction and the Z-axis direction and inclining the cutting tool 36 with the axis ax2 as a center. In this case, more specifically, even if there is no approach angle manual fine adjusting function to be performed by the angle adjustment reception processing unit M28, it is possible to finely adjust the approach angle command value 58 ($α_d$) by inputting the approach angle α in the processing of step S28 in FIG. 10 to directly rewrite the approach angle data in the working program when the chatter occurs during the turning work with the set approach angle command value 58 ($α_d$).

"Regarding the Turning Device"

For example, instead of providing the Z-axis driving unit 44 for displacing the tool holding device 16 in the Z-axis direction, it is possible to provide a driving unit for displacing the spindle 12 in the Z-axis direction. Moreover, instead of providing the X-axis driving unit 42 for displacing the tool holding unit 14 in the X-axis direction, for example, it is possible to provide a driving unit for displacing the spindle 12 in the X-axis direction.

"Regarding the Tool"

The cutting tool is not limited to a cutting tool in which an insert and a shank are separated from each other but may be a cutting tool having the insert and the shank formed integrally.

"Regarding the Notification Processing Unit"

The notification processing unit is not limited to a unit which gives a notification through visual information, for example, but may be a unit which gives a notification by sound.

"Regarding the Command Processing Unit"

The command processing unit is not limited to a unit which corrects the X-axis command amount and the Z-axis command amount output from the working program processing unit with the approach angle compensation amount and outputs the corrected amounts, thereby executing the turning program. The tool data indicative of the cutting edge position may be corrected with the approach angle compensation amount. In this case, the working program processing shown in FIG. 17 calculates the X-axis command amount or the Z-axis command amount based on the tool data corrected with the approach angle compensation amount. Therefore, it is possible to delete the processing for correcting the X-axis command amount and the Z-axis command amount with the approach angle compensation amount from the command processing unit.

In the above-described device, it is possible to properly change the approach angle for the turning work by setting the approach angle command value and calculating the B-axis command amount for controlling the approach angle for the turning work to be the approach angle command value, and outputting the B-axis command amount to the B-axis driving unit. By changing the approach angle, it is possible to change the thrust force to be applied to the workpiece by the tool. As a result, the approach angle in the turning work is adjusted so that the thrust force can be set to zero or a very small value. For this reason, even if a special tool is not used, it is possible to greatly increase the turning accuracy by setting a proper approach angle command value to use a general purpose tool.

When the B axis is inclined in order to control the approach angle to be the approach angle command value, the cutting edge position is displaced in the X-Z plane. Such an approach angle compensation amount to cancel the displacement is calculated and stored. By simply correcting the X-axis command amount and the Z-axis command amount in the working operation with the approach angle compensation amount, consequently, it is possible to carry out the turning work without performing new complicated processing for controlling the approach angle.

In the above-described device, the approach angle in the turning work can be changed after the start of the turning work and before the completion of the turning work. In the case where chatter is detected during the turning work, therefore, it is possible to suppress the chatter by changing the approach angle command value at once and a change for enhancing accuracy of the turning work can be easily made.

When the B-axis position is changed in order to change the approach angle in the turning work, the cutting edge position of the tool is changed in the X-axis direction and the Z-axis direction depending on a distance between the cutting edge position of the tool and a B-axis center. For this reason, it is difficult to change the approach angle during the turning work. In the above-described device, therefore, the turning work is interrupted when the instruction to change the approach angle is received. Consequently, the cutting edge can be kept away from the workpiece by manual operation during the interruption. By keeping the cutting edge away from the workpiece, the cutting edge of the tool does not interfere with the workpiece even if the cutting edge position is changed in the X-axis direction and the Z-axis direction. As a result, it is possible to simply change the approach angle command value.

In the above-described device, by providing the approach angle command value storage processing unit, it is possible to register the approach angle command value received by the angle adjustment reception processing unit into the working program in the case where the approach angle command value is a proper value.

When the B axis is inclined in order to change the approach angle command value, the cutting edge position is changed based on a positional relationship between the B-axis center and the cutting edge on the XZ plane, so that the cutting depth fluctuates. In this respect, in the above-described device, the X-axis operation compensation amount and the Z-axis operation compensation amount for canceling the displacement from the latest cutting edge position are calculated and simultaneously output with the approach angle setting command amount. Even if the approach angle command value is variously changed during the interruption of the turning work, consequently, it is possible to change the approach angle without changing the cutting edge position.

In the above-described device, the approach angle calculation processing unit calculates the approach angle at which the thrust force generated in the turning work is equal to or smaller than the specified value. Therefore, even an operator having no information about the approach angle capable of reducing the thrust force can also perform the turning work capable of reducing the thrust force.

If the approach angle and the tool shape are apparent, it is possible to know whether or not the tool interferes with the workpiece. For this reason, in the above-described device, it is possible to determine the interference between the tool and the workpiece based on the approach angle command value and the tool shape, to determine that the turning work cannot performed or/and to give the notification of the determination.

Obviously, numerous modifications and variations of the present invention are possible in light of the above teachings. It is therefore to be understood that within the scope of the appended claims, the invention may be practiced otherwise than as specifically described herein.

What is claimed is:

1. A turning controller using a turning device, the turning device comprising:
   a spindle to be rotated together with a workpiece held thereon;
   a tool holder to hold a tool to turn the workpiece;
   a Z-axis driver to displace at least one of the spindle and the tool holder in a Z-axis direction which is a direction parallel to a rotation axis of the spindle;
   an X-axis driver to displace at least one of the spindle and the tool holder in an X-axis direction orthogonal to the Z axis; and
   a B-axis driver to incline the tool holder around a Y axis orthogonal to both of the Z axis and the X axis,
   to rotate the workpiece held on the spindle and relatively feed the tool in at least the Z-axis direction in a cutting state in a predetermined cutting depth in the X-axis direction with respect to the workpiece, thereby performing turning work,
   the turning controller comprising:
   a storage configured to store a working program for defining the turning work and tool shape data indicative of a shape of the tool;
   a working program processor configured to analyze the working program and to calculate and output command amounts for the Z-axis driver, the X-axis driver, and the B-axis driver;
   a command value setting processor configured to set an approach angle command value for defining an approach angle which is an angle formed by a cutting edge of the tool and a direction orthogonal to a relative feeding direction of the tool with respect to the workpiece when performing the turning work;
   an approach angle setting command amount calculator configured to calculate, as an approach angle setting command amount, a B-axis command amount for controlling to cause the approach angle to have the approach angle command value based on the tool shape data; and
   a command processor configured to output the approach angle setting command amount to the B-axis driver, wherein
   the working program includes cutting depth data for defining a cutting depth and approach angle data for defining the approach angle,
   the turning controller further comprises an approach angle calculator configured to calculate an approach angle at which an absolute value of a thrust force to be applied to the workpiece by the tool is equal to or smaller than a specified value when performing the turning work according to the cutting depth data of the working program,
   the approach angle calculator is configured to register the calculated approach angle as the approach angle data into the working program,
   the command value setting processor is configured to set the approach angle data to the approach angle command value, and
   operation of the turning device is controlled based on the approach angle command value.

2. The turning controller according to claim 1, further comprising an angle adjustment reception processor configured to receive an instruction to change the approach angle command value set by the command value setting processor, and to change the approach angle command value based on the received instruction after start of the turning work and before completion of the turning work,
   wherein the command processor is configured to output, to the B-axis driver, the approach angle setting command amount corresponding to the changed approach angle command value, the approach angle setting command amount being calculated by the approach angle setting command amount calculator.

3. The turning controller according to claim 2, wherein the angle adjustment reception processor has a function of temporarily stopping the turning work upon receipt of the instruction to change the approach angle command value during the turning work, and
   the command processor is configured to output, to the B-axis driver, the approach angle setting command amount corresponding to the changed approach angle command value during the stop of the turning work by the angle adjustment reception processor, the approach angle setting command amount being calculated by the approach angle setting command amount calculator.

4. The turning controller according to claim 3, wherein the storage is configured to further store tool data indicative of a cutting edge position of the tool when the tool is held by the tool holder,
   the turning controller further comprises a compensation amount calculator configured to calculate, based on the tool data, an operation compensation amount for compensating a displacement in an XZ plane between a cutting edge position in a latest B-axis position and an cutting edge position in B-axis inclined in accordance with the approach angle setting command value when the angle adjustment reception processor changes the approach angle command value, and the command processor is configured to simultaneously output the approach angle setting command amount and the operation compensation amount to the B-axis driver, the X-axis driver, and the Z-axis driver.

5. The turning controller according to claim 2, wherein the working program includes approach angle data for defining an approach angle during the turning work, the command value setting processor is configured to set the approach angle data of the working program to the approach angle command value, the turning controller further comprises an approach angle command value storage processor configured to receive a command to register the approach angle command value changed by the angle adjustment reception processor into the working program, and the approach angle command value storage processor is configured to register the changed approach angle command value as the approach angle data into the working program upon receipt of an instruction to store in the working program.

6. The turning controller according to claim 1, further comprising:

a determination processor is configured to determine whether or not the turning work can be performed based on the approach angle command value set by the command value setting processor and the tool shape data; and a notification processor is configured to give a notification of determination when the determination processor determines that the turning work cannot be performed.

* * * * *